(12) United States Patent
Tanaka et al.

(10) Patent No.: US 10,442,413 B2
(45) Date of Patent: Oct. 15, 2019

(54) BRAKE CONTROL APPARATUS

(71) Applicant: Hitachi Automotive Systems, Ltd., Ibaraki (JP)

(72) Inventors: Yuki Tanaka, Yokohama (JP); Wataru Yokoyama, Yokohama (JP); Kimio Nishino, Atsugi (JP); Masayoshi Okamiya, Atsugi (JP); Kenichiro Matsubara, Kasumigaura (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 264 days.

(21) Appl. No.: 15/560,290

(22) PCT Filed: Mar. 22, 2016

(86) PCT No.: PCT/JP2016/058986
§ 371 (c)(1),
(2) Date: Sep. 21, 2017

(87) PCT Pub. No.: WO2016/158569
PCT Pub. Date: Oct. 6, 2016

(65) Prior Publication Data
US 2018/0072285 A1 Mar. 15, 2018

(30) Foreign Application Priority Data
Mar. 31, 2015 (JP) ................. 2015-073691

(51) Int. Cl.
*B60T 8/172* (2006.01)
*B60T 13/74* (2006.01)
(Continued)

(52) U.S. Cl.
CPC ............ *B60T 8/172* (2013.01); *B60T 13/586* (2013.01); *B60T 13/74* (2013.01); *B60T 13/741* (2013.01);
(Continued)

(58) Field of Classification Search
CPC ...... B60T 8/172; B60T 13/586; B60T 13/741; B60T 13/74; B60T 2270/89;
(Continued)

(56) References Cited

U.S. PATENT DOCUMENTS

2002/0027386 A1  3/2002  Yanaka et al.
2017/0369047 A1* 12/2017  Okada .................... B60T 17/18

FOREIGN PATENT DOCUMENTS

JP       5-44739     6/1993
JP    2002-67916    3/2002
(Continued)

OTHER PUBLICATIONS

International Search Report dated Jun. 7, 2016 in International Application No. PCT/JP2016/058986.

*Primary Examiner* — Nga X Nguyen
(74) *Attorney, Agent, or Firm* — Wenderoth, Lind & Ponack, L.L.P.

(57) ABSTRACT

A parking brake control apparatus 20 drives an electric motor 43B to advance a piston 39 according to an application request signal from a parking brake switch 19. The parking brake control apparatus 20 includes a running state detection portion that calculates a running state about whether a vehicle is running or stopped based on a wheel signal from a wheel speed sensor 18. When the running state cannot be calculated by the running state detection portion, the parking brake control apparatus 20 controls the electric motor 43B in such a manner that the thrust force of the piston 39 changes at a lower time rate of change than when the running state can be calculated.

6 Claims, 11 Drawing Sheets

(51) Int. Cl.
  *B60T 13/58* (2006.01)
  *F16D 55/226* (2006.01)
  *F16D 65/18* (2006.01)
  *F16D 121/04* (2012.01)
  *F16D 121/14* (2012.01)
  *F16D 121/24* (2012.01)
  *F16D 125/40* (2012.01)
  *F16D 125/08* (2012.01)

(52) U.S. Cl.
  CPC ......... *F16D 55/226* (2013.01); *F16D 65/183* (2013.01); *B60T 2220/04* (2013.01); *B60T 2270/89* (2013.01); *F16D 2121/04* (2013.01); *F16D 2121/14* (2013.01); *F16D 2121/24* (2013.01); *F16D 2125/08* (2013.01); *F16D 2125/40* (2013.01)

(58) Field of Classification Search
  CPC .. B60T 2220/04; F16D 65/183; F16D 55/226; F16D 2125/08; F16D 2125/40; F16D 2121/24; F16D 2121/14; F16D 2121/04
  See application file for complete search history.

(56) References Cited

FOREIGN PATENT DOCUMENTS

| | | |
|---|---|---|
| JP | 2003-63376 | 3/2003 |
| JP | 2005-162013 | 6/2005 |

* cited by examiner

BRAKE CONTROL APPARATUS

TECHNICAL FIELD

The present invention relates to a brake control apparatus that applies a braking force to a vehicle.

BACKGROUND ART

There is known an electric parking brake mechanism activated based on driving of an electric motor as a brake apparatus mounted on a vehicle such as an automobile (PTL 1). PTL 1 discusses a technique for activating an ABS when activating the electric parking brake mechanism to use a parking brake as an auxiliary brake while the vehicle is running.

CITATION LIST

Patent Literature

PTL 1: Japanese Patent Application Public Disclosure No. 2002-67916

SUMMARY OF INVENTION

Technical Problem

However, when a failure in a wheel speed sensor or the like makes it impossible to calculate a running state of the vehicle, the vehicle parking brake apparatus discussed in PTL 1 may be unable to detect a slip rate of a wheel, resulting in excessive application of a braking force generated by the parking brake while the vehicle is running.

An object of the present invention is to provide a brake control apparatus capable of preventing or reducing the excessive application of the braking force when the running state of the vehicle cannot be calculated.

Solution to Problem

To achieve the above-described object, a brake control apparatus according to the present invention includes a braking member configured to press a braking target member rotating together with a wheel, a pressing member configured to displace the braking member in directions away from and toward the braking target member, a pressing member holding mechanism provided on a non-rotatable portion of a vehicle and configured to hold the pressing member advanced by an electric motor, and a control portion configured to receive an activation request signal for activation for holding or releasing the pressing member according to an operation instruction from a driver and control driving the electric motor so as to displace the pressing member according to this activation request signal. The control portion includes a running state detection portion configured to calculate a running state about whether the vehicle is running or stopped. The control portion is configured to control the electric motor in such a manner that a thrust force of the pressing member changes at a lower time rate of change when the running state cannot be calculated by the running state detection portion than when the running state can be calculated.

The brake control apparatus according to the present invention can prevent or reduce the excessive application of the braking force when the running state of the vehicle cannot be calculated.

DESCRIPTION OF EMBODIMENTS

In the following description, a brake control apparatus according to an embodiment will be described based on an example in which this brake control apparatus is mounted on a four-wheeled automobile with reference to the accompanying drawings. Individual steps in flowcharts illustrated in FIGS. 4 to 9 will be each expressed with use of the symbol "S", and, for example, step 1 will be expressed as "S1".

Figure 1:
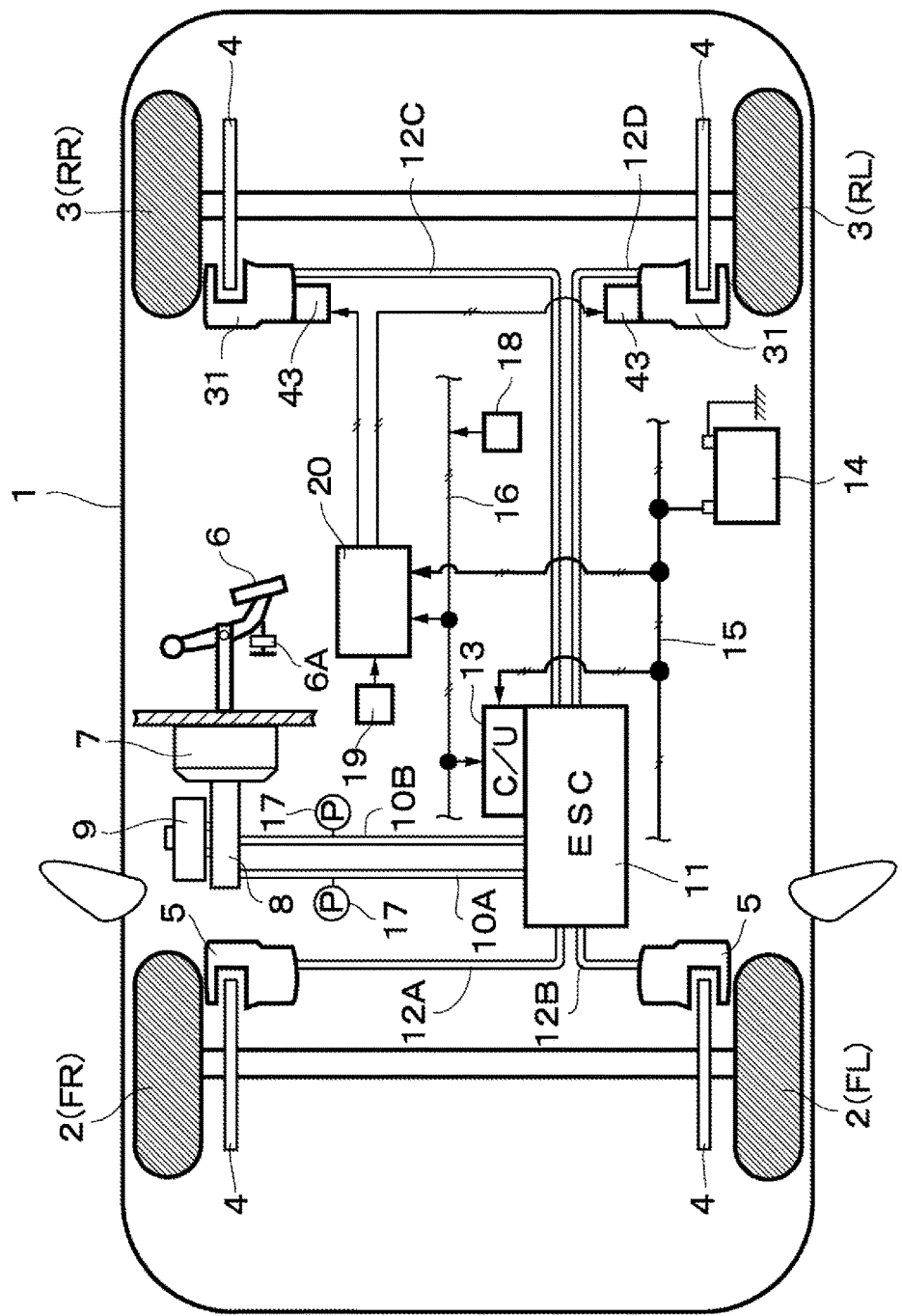
FIG. 1 is a conceptual diagram illustrating a vehicle on which a brake control apparatus according to an embodiment is mounted.

FIGS. 1 to 5 illustrate a first embodiment. In FIG. 1, four wheels in total that include, for example, front left and right wheels 2 (FL and FR) and rear left and right wheels 3 (RL and RR) are mounted under a vehicle body 1 forming a main structure of a vehicle (on a road surface side). A disk rotor 4 is provided to each of these front wheels 2 and rear wheels 3 as a driving target member (a rotational member) rotatable together with each of the wheels (each of the front wheels 2 and each of the rear wheels 3). The disk rotor 4 for the front wheel 2 is subjected to a braking force by a hydraulic disk brake 5, and the disk rotor 4 for the rear wheel 3 is subjected to a braking force by a hydraulic disk brake 31 equipped with an electric parking brake function. Due to this configuration, a barking brake is applied to each of the wheels (each of the front wheels 2 and each of the rear wheels 3) independently of one another.

A brake pedal 6 is provided on a dash board side of the vehicle body 1. The brake pedal 6 is operated by being pressed by a driver at the time of an operation of braking the vehicle, and the braking force as a regular brake (a service brake) is applied and released to and from each of the disk brakes 5 and 31 based on this operation. A brake lamp switch, a pedal switch, and a brake operation detection sensor (a brake sensor) 6A such as a pedal stroke sensor is provided at the brake pedal 6. The brake operation detection sensor 6A detects presence or absence of the operation of pressing the brake pedal 6 or an operation amount thereof, and outputs a detection signal thereof to a hydraulic supply apparatus controller 13. The detection signal of the brake operation detection sensor 6A is transmitted via, for example, a vehicle data bus 16 or a signal line (not illustrated) connecting the hydraulic supply apparatus controller 13 and the parking brake control apparatus 20 to each other (output to a parking brake control apparatus 20).

The operation of pressing the brake pedal 6 is transmitted to a master cylinder 8 serving as a hydraulic source via a booster 7. The booster 7 is configured as a negative pressure booster or an electric booster provided between the brake pedal 6 and the master cylinder 8, and transmits a pressing force to the master cylinder 8 while boosting the pressing force at the time of the operation of pressing the brake pedal 6. At this time, the master cylinder 8 generates a hydraulic pressure with the aid of brake fluid supplied from a master reservoir 9. The master reservoir 9 includes a hydraulic fluid tank containing the brake fluid therein. The mechanism for generating the hydraulic pressure by the brake pedal 6 is not limited to the above-described configuration, and may be a mechanism that generates the hydraulic pressure according to the operation performed on the brake pedal 6, such as a brake-by-wire type mechanism.

The hydraulic pressure generated in the master cylinder 8 is transmitted to a hydraulic supply apparatus 11 (hereinafter referred to as an ESC 11) via, for example, a pair of cylinder-side hydraulic pipes 10A and 10B. The ESC 11 is disposed between each of the disk brakes 5 and 31 and the master cylinder 8, and distributes the hydraulic pressure from the master cylinder 8 to each of the disk brakes 5 and 31 via brake-side pipe portions 12A, 12B, 12C, and 12D. By this operation, the ESC 11 applies the braking force to each of the wheels (each of the front wheels 2 and each of the rear wheels 3) independently of one another. In this case, the ESC 11 can supply the hydraulic pressure to each of the disk brakes 5 and 31, i.e., increase the hydraulic pressure in each of the disk brakes 5 and 31 even in a mode that works independently of the operation amount of the brake pedal 6.

For achieving this function, the ESC 11 includes a dedicated control apparatus including, for example, a microcomputer, i.e., the hydraulic supply apparatus controller 13 (hereinafter referred to as the control unit 13). The control unit 13 performs driving control of opening and closing each of control valves (not illustrated) of the ESC 11, and rotating and stopping an electric motor (not illustrated) for a hydraulic pump. By this operation, the control unit 13 performs control of increasing, reducing, or maintaining the brake hydraulic pressure to be supplied from the brake-side pipe portions 12A to 12D to each of the disk brakes 5 and 31. This operation realizes execution of various kinds of brake control, such as boosting control, braking force distribution control, brake assist control, anti-lock brake control (ABS), traction control, vehicle stabilization control (including electronic stability control), hill start aid control, and automatic driving control.

Power is supplied from a battery 14 to the control unit 13 via a power source line 15. As illustrated in FIG. 1, the control unit 13 is connected to the vehicle data bus 16. Instead of the ESC 11, a known ABS unit can also be used. Alternatively, the master cylinder 8 and the brake-side pipe portions 12A to 12D can also be directly connected to each other without the provision of the ESC 11 (i.e., with the ESC 11 omitted).

The vehicle data bus 16 forms a CAN (Controller Area Network) as a serial communication portion mounted on the vehicle body 1. A large number of electronic devices mounted on the vehicle, the control unit 13, the parking brake control apparatus 20, and the like carry out in-vehicle multiplex communication among them with use of the vehicle data bus 16. In this case, examples of vehicle information transmitted to the vehicle data bus 16 include information (vehicle information) based on detection signals from the brake operation detection sensor 6A, a pressure sensor 17 that detects a master cylinder hydraulic pressure (the brake hydraulic pressure), an ignition switch, a safety belt sensor, a door lock sensor, a door opening sensor, a seat occupancy sensor, a vehicle speed sensor, a steering angle sensor, an accelerator sensor (an accelerator operation sensor), a throttle sensor, an engine rotation sensor, a stereo camera, a millimeter-wave radar, an inclination sensor, a shift sensor, an acceleration sensor, a wheel speed sensor 18, a pitch sensor that detects a motion of the vehicle in a pitch direction, and the like.

Then, the wheel speed sensor 18 is mounted, for example, for each of the wheels (each of the front wheels 2 and each of the rear wheels 3), and functions to output a wheel signal according to a rotational state (a rotational speed) of each of the wheels 2 and 3. The parking brake control apparatus 20, which will be described below, includes a running state detection portion that calculates a running state about whether the vehicle is running or stopped, based on the wheel signal from the wheel speed sensor 18. In the embodiment, the parking brake control apparatus 20 is configured to use the detection signal of the wheel speed sensor 18 as the wheel signal. However, the wheel signal is not limited thereto, and a signal having a correlation (a corresponding relationship) with the rotational state of the wheel 2 or 3, such as the detection signal of the vehicle speed sensor and the detection signal of the acceleration sensor, may be used as the wheel signal according to the rotational state of the wheel 2 or 3.

A parking brake switch (PKBSW) 19 is provided in the vehicle body 1 at a position located close to a driver's seat (not illustrated). The parking brake switch 19 functions as an operation instruction portion operated by the driver. The parking brake switch 19 transmits to the parking brake control apparatus 20 a signal (an activation request signal) corresponding to a request to activate the parking brake (an application request serving as a holding request or a release request serving as a braking stop request) according to an operation instruction from the driver. In other words, the parking brake switch 19 outputs an activation signal (an application request signal or a release request signal) to activate a piston 39 and thus brake pads 33 (refer to FIG. 2) for the application (holding activation) or the release (release activation) based on driving (a rotation) of an electric motor 43B to the parking brake control apparatus 20, which serves as a control unit (a controller).

When the parking brake switch 19 is operated by the driver toward a braking side (an application side), i.e., when the application request (the holding request or a driving request) for applying the braking force to the vehicle is issued, the application request signal is output from the parking brake switch 19. In this case, power for rotating the electric motor 43B toward a braking side is supplied to the disk brake 31 for the rear wheel 3 via the parking brake control apparatus 20. As a result, the disk brake 31 for the rear wheel 3 is set into a state where the braking force as parking brake (or auxiliary brake) is applied thereto, i.e., an application state (a holding state).

On the other hand, when the parking brake switch 19 is operated by the driver toward a braking release side (a release side), i.e., when the release request (a braking stop request) for releasing the braking force on the vehicle is issued, the release request signal is output from the parking brake switch 19. In this case, power for rotating an electric actuator 43B in an opposite direction from the braking side is supplied to the disk brake 31 via the parking brake control apparatus 20. As a result, the disk brake 31 for the rear wheel 3 is set into a state where the application of the braking force as the parking brake (or the auxiliary brake) is released, i.e., a release state (a braking stop state).

The parking brake can be configured to be automatically applied (an automatic application) based on an automatic application request due to a logic for determining the application of the parking brake by the parking brake control apparatus 20, for example, when the vehicle is kept stopped for a predetermined time period (the vehicle is determined to be stopped, for example, when the speed detected by the vehicle speed sensor is kept lower than 4 km/h for a predetermined time period according to deceleration while the vehicle is running), when the engine is stopped, when a shift lever is operated to P, when a door is opened, or when a safety belt is released. Further, the parking brake can be configured to be automatically released (an automatic release) based on an automatic release request due to a logic for determining the release of the parking brake by the parking brake control apparatus 20, for example, when the vehicle is running (the vehicle is determined to be running, for example, when the speed detected by the vehicle speed sensor is kept at 5 km/h or higher for a predetermined time period according to acceleration from a stopped state), when an accelerator pedal is operated, a clutch pedal is operated, or when the shift lever is operated to a position other than P and N.

Further, when the application request is issued by the parking brake switch 19 when the vehicle is running, more specifically, when a dynamic parking brake (a dynamic application), such as use of the parking brake as the auxiliary brake urgently while the vehicle is running, is requested, for example, the braking force is applied while the parking brake switch 19 is operated toward the braking side (while the operation toward the braking side continues), and the application of the braking force is released upon an end of the operation. The parking brake control apparatus 20 can also be configured to automatically apply and release the braking force according to a state of the wheel (each of the rear wheels 3), i.e., whether the wheel is locked (slipping) (ABS control) at this time.

Figure 2:
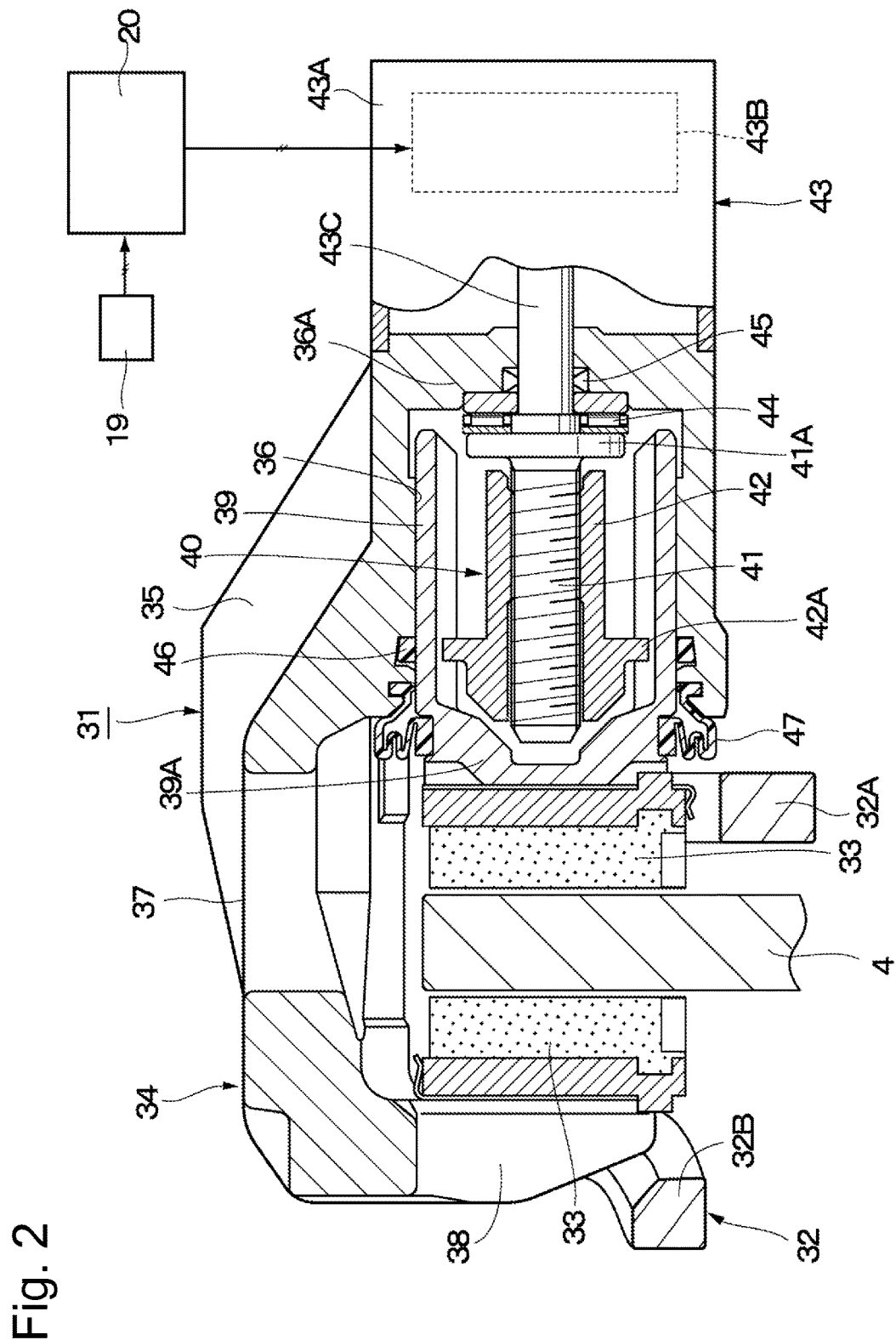
FIG. 2 is a vertical cross-sectional view illustrating a disk brake mounted on a rear wheel side in FIG. 1 and equipped with an electric parking brake function in an enlarged manner.

Next, a configuration of each of the disk brakes 31 and 31 equipped with the electric parking brake function that are mounted on the left and right rear wheel 3 and 3 sides will be described with reference to FIG. 2. FIG. 2 illustrates only one of the left and right disk brakes 31 and 31 respectively mounted in correspondence with the left and right rear wheels 3 and 3 as a representative example.

The pair of disk brakes 31 mounted on the left side and the right side of the vehicle, respectively, are each configured as a hydraulic disk brake equipped with the electric parking brake function. The disk brake 31 forms a brake system together with the parking brake control apparatus 20. The disk brake 31 includes a mount member 32 attached to a non-rotatable portion on the rear wheel 3 side of the vehicle, the inner-side and outer-side brake pads 33 as a braking member (a frictional member), and a caliper 34 as a brake mechanism provided with the electric actuator 43.

In this case, the disk brake 31 applies the braking force to the wheel (the rear wheel 3) and thus the vehicle by advancing the brake pads 33 by the piston 39 with the aid of the hydraulic pressure based on, for example, the operation performed on the brake pedal 6 to press the disk rotor 4 with the brake pads 33. In addition thereto, the disk brake 31 applies the braking force to the vehicle by advancing the piston 39 with use of the electric motor 43B (via a rotation-linear motion conversion mechanism 40) according to the activation request based on the signal from the parking brake switch 19, or the activation request based on the above-described logic for determining the application or the release of the parking brake, or the ABS control. In other words, the disk brake 31 functions as a driving portion that conducts application driving of applying the braking force to the vehicle and release driving of releasing this braking force, by supplying the current to the electric motor 43B. In this case, the disk brake 31 is mounted on each of the left and right wheels of the vehicle, in particular, each of the rear left and right wheels 3 and 3 in the embodiment.

The mount member 32 includes a pair of arm portions (not illustrated), a support portion 32A, and a reinforcement beam 32B. The pair of arm portions is provided so as to extend in an axial direction of the disk rotor 4 (i.e., a disk axial direction) over an outer periphery of the disk rotor 4 and be spaced apart from each other in a disk circumferential direction. The support portion 32A is formed as a relatively thick portion, and is provided so as to integrally couple respective proximal end sides of these arm portions with each other and is fixed to the non-rotatable portion of the vehicle at a position located on an inner side of the disk rotor 4. The reinforcement beam 32B is formed so as to couple respective distal end sides of the above-described arm portions with each other at a position located on an outer side of the disk rotor 4.

The inner-side and outer-side brake pads 33 are disposed so as to be able to abut against both surfaces of the disk rotor 4, and are supported so as to be movable in the disk axial direction by each of the arm portions of the mount member 32. The inner-side and outer-side brake pads 33 are pressed against the both surface sides of the disk rotor 4 by the caliper 34 (a claw portion 38 of a caliper main body 35 and the piston 39). Due to this configuration, the brake pads 33 apply the braking force to the vehicle by pressing the disk rotor 4 rotating together with the wheel (the rear wheel 3).

The caliper 34, which serves as a wheel cylinder, is disposed at the mount member 32 so as to extend over the outer peripheral side of the disk rotor 4. The caliper 34 includes, for example, the rotation-linear motion conversion mechanism 40 and the electric actuator 43, which will be described below, in addition to the caliper main body 35 and the piston 39. The caliper main body 35 is supported movably along the axial direction of the disk rotor 4 relative to the each of the arm portions of the mount member 32. The piston 39 is provided by being slidably fittedly inserted in this caliper main body 35. The caliper 34 advances the brake pads 33 with use of the piston 39 activated by the hydraulic pressure generated in the master cylinder 8 based on the operation performed on the brake pedal 6.

The caliper main body 35 includes a cylinder portion 36 and a bridge portion 37 which are on the inner side, and the claw portion 38 on the outer side. The cylinder portion 36 is formed into a bottomed cylindrical shape having one axial side closed by a partition wall portion 36A, and the other axial side facing the disk rotor 4 that is opened. The bridge portion 37 is formed so as to extend from this cylinder portion 36 in the disk axial direction over the outer peripheral side of the disk rotor 4. The claw portion 38 is arranged so as to extend radially inwardly from the bridge portion 37 on an opposite side from the cylinder portion 36.

The hydraulic pressure is supplied into the cylinder portion 36 of the caliper main body 35 via the brake-side pipe portion 12C or 12D illustrated in FIG. 1 according to, for example, the operation of pressing the brake pedal 6. This cylinder portion 36 is formed integrally with the partition wall portion 36A. The partition wall portion 36A is located between the cylinder portion 36 and the electric actuator 43. The partition wall portion 36A includes an axial through-hole, and an output shaft 43C of the electric actuator 43 is rotatably inserted into an inner peripheral side of the partition wall portion 36A.

The piston 39 as a pressing member (a movable member), and the rotation-linear motion conversion mechanism 40 are provided in the cylinder portion 36 of the caliper main body 35. In the embodiment, the rotation-linear motion conversion mechanism 40 is contained in the piston 39. However, the rotation-linear motion conversion mechanism 40 does not necessarily have to be contained in the piston 39 as long as the rotation-linear motion conversion mechanism 40 is configured to advance the piston 39. In other words, the rotation-linear motion conversion mechanism 40 serving as a pressing member holding mechanism may be provided at a different location as long as this location is a non-rotatable portion of the vehicle.

The piston 39 displaces the brake pads 33 in directions away from and toward the disk rotor 4 (in directions moving away from and approaching the disk rotor 4). One axial side of the piston 39 is opened, and the other axial side of the piston 39 that faces the inner-side brake pad 33 is closed by a cover portion 39A. This piston 39 is inserted in the cylinder portion 36. The piston 39 is also displaced due to the supply of the hydraulic pressure into the cylinder portion 36 based on, for example, the pressing of the brake pedal 6 or the like, in addition to being displaced due to the supply of the current to the electric actuator 43 (the electric motor 43B). In this case, the displacement of the piston 39 by the electric actuator 43 (the electric motor 43B) is accomplished by being pressed by a linearly movable member 42. Further, the rotation-linear motion conversion mechanism 40 is contained inside the piston 39, and the piston 39 is configured to be advanced in an axial direction of the cylinder portion 36 by the rotation-linear motion conversion mechanism 40.

The rotation-linear motion conversion mechanism 40 functions as a pressing member holding mechanism. More specifically, the rotation-linear motion conversion mechanism 40 advances the piston 39 by an external force different from the force generated by the supply of the hydraulic pressure into the cylinder portion 36, i.e., the force generated by the electric motor 43, and also holds the advanced piston 39 and the brake pads 33 there. As a result, the parking brake is set into the application state (the holding state). On the other hand, the rotation-linear motion conversion mechanism 40 retracts the piston 39 in an opposite direction from the advancing direction by the electric actuator 43, thereby setting the parking brake into the release state (the stop state). Then, because the left and right disk brakes 31 are provided for the rear left and right wheels 3, respectively, the rotation-linear motion conversion mechanisms 40 and the electric actuators 43 are also provided on the left and right sides of the vehicle, respectively.

The rotation-linear motion conversion mechanism 40 includes a screw member 41 and the linearly movable member 42 (as a spindle nut mechanism). The screw member 41 includes a rod-like body with a male screw such as a trapezoidal screw thread formed thereon. The linearly movable member 42 includes a female screw hole formed by a trapezoidal screw thread on an inner peripheral side thereof. The linearly movable member 42 serves as a driving target member (an advancing member) displaced toward or away from the piston 39 by the electric actuator 43. In other words, the screw member 41 threadably engaged with the inner peripheral side of the linearly movable member 42 forms a screw mechanism that converts a rotational motion by the electric actuator 43 into a linear motion of the linearly movable member 42. In this case, the female screw of the linearly movable member 42 and the male screw of the screw member 41 are formed with use of highly irreversible screws, in particular, the trapezoidal screw threads in the embodiment, thereby realizing the pressing member holding mechanism.

The pressing member holding mechanism (the rotation-linear motion conversion mechanism 40) is configured to hold the linearly movable member 42 (i.e., the piston 39) at an arbitrary position with the aid of a frictional force (a holding force) even when the power supply to the electric motor 43B is stopped. The pressing member holding mechanism may be any mechanism that can hold the piston 39 at a position to which the piston 39 is advanced by the electric actuator 43. For example, the pressing member holding mechanism may be realized with use of a highly irreversible screw other than the trapezoidal screw thread, such as a normal screw triangular in cross-section or a worm gear.

The screw member 41 provided while being threadably engaged with the inner circumferential side of the linearly movable member 42 includes a flange portion 41A as a large-diameter flange portion on one axial side, and the other axial side of the screw member 41 extends toward the cover portion 39A of the piston 39. The screw member 41 is integrally coupled with the output shaft 43C of the electric actuator 43 at the flange portion 41A. Further, an engagement protrusion 42A is provided on an outer peripheral side of the linearly movable member 42. The engagement protrusion 42A prohibits the linearly movable member 42 from rotating relative to the piston 39 (regulates a relative rotation) while allowing the linearly movable member 42 to axially move relative to the piston 39. Due to this configuration, the linearly movable member 42 linearly moves by being driven by the electric motor 43B, and contacts the piston 39 to displace this piston 39.

The electric actuator 43 is fixed to the caliper main body 35 of the caliper 34. The electric actuator 43 activates (applies/releases) the disk brake 31 according to the activation request signal from the parking brake switch 19, the above-described logic for determining the application or the release of the parking brake, or the ABS control. The electric actuator 43 includes a casing 43A, a speed reducer (not illustrated), the electric motor 43B, and the output shaft 43C. The casing 43A is attached to an outside of the partition wall portion 36A. The electric motor 43B is located in the casing 43A, and includes a stator, a rotor, and the like. Then, the electric motor 43B displaces the piston 39 due to the supply of power (a current) thereto. The speed reducer (not illustrated) amplifies a torque of the electric motor 43B. The output shaft 43C is configured to output a rotational torque after the torque is amplified by the speed reducer. The electric motor 43B is configured as an electric motor such as a direct-current brushed motor. The output shaft 43C extends axially through the partition wall portion 36A of the cylinder portion 36, and is coupled with an end of the flange portion 41A of the screw member 41 in the cylinder portion 36 so as to rotate integrally with the screw member 41.

A coupling mechanism between the output shaft 43C and the screw member 41 can be configured so as to, for example, allow them to move in the axial direction but prohibit them from rotating in the rotational direction. In this case, the output shaft 43B and the screw member 41 are coupled with each other with use of a known technique such as spline fitting or fitting using a polygonal rod (non-circular fitting). The speed reducer may be embodied with use of, for example, a planetary gear reducer or a worm gear reducer. Further, in a case where the speed reducer is embodied with use of a known speed reducer unable to operate reversely (an irreversible speed reducer) such as the worm gear reducer, a known reversible mechanism such as a ball screw or a ball ramp mechanism can be used as the rotation-linear motion conversion mechanism 40. In this case, the pressing member holding mechanism can be realized by, for example, the reversible rotation-linear motion conversion mechanism and the irreversible speed reducer.

Figure 3:
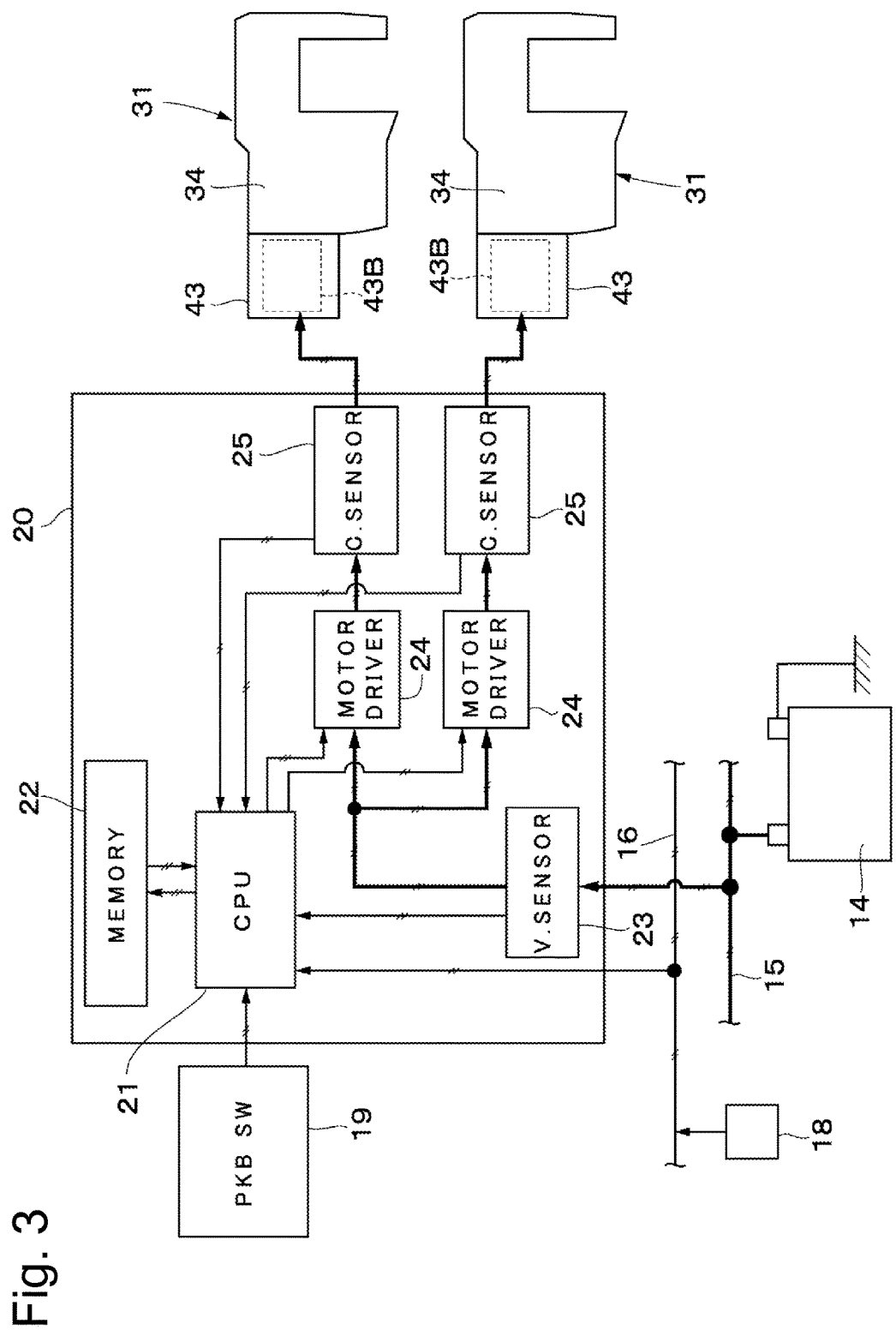
FIG. 3 is a block diagram illustrating a parking brake control apparatus illustrated in FIG. 1.

When the driver operates the parking brake switch 19 illustrated in FIGS. 1 to 3, power is supplied to the electric motor 43B via the parking brake control apparatus 20, and the output shaft 43C of the electric actuator 43 is rotated. Therefore, the screw member 41 of the rotation-linear motion conversion mechanism 40 is rotated integrally with the output shaft 43C in one direction, and advances (drives) the piston 39 toward the disk rotor 4 side via the linearly movable member 42. As a result, the disk brake 31 sandwiches the disk rotor 4 between the inner-side and outer-side brake pads 33, thereby being set into the state applying the braking force as the electric parking brake, i.e., the application state (the holding state).

On the other hand, when the parking brake switch 19 is operated toward the braking release side, the screw member 41 of the rotation-linear motion conversion mechanism 40 is rotationally driven by the electric actuator 43 in the other direction (the reverse direction). As a result, the linearly movable member 42 (and the piston 39 if the hydraulic pressure is not supplied) is driven away from the disk rotor 4, whereby the disk brake 31 is set into the state releasing the application of the braking force as the parking brake, i.e., the braking stop state (the release state).

In this case, in the rotation-linear motion conversion mechanism 40, when the screw member 41 is rotated relative to the linearly movable member 42, the rotation of the linearly movable member 42 in the piston 39 is regulated. Therefore, the linearly movable member 42 axially relatively moves according to a rotational angle of the screw member 41. In this manner, the rotation-linear motion conversion mechanism 40 converts the rotational motion into the linear motion, thereby causing the linearly movable member 42 to advance the piston 39. Further, along therewith, the rotation-linear motion conversion mechanism 40 holds the linearly movable member 42 at the arbitrary position with the aid of the frictional force with the screw member 41, thereby holding the piston 39 and the brake pads 33 at the positions to which they are advanced by the electric actuator 43.

A thrust bearing 44 is provided on the partition wall portion 36A of the cylinder portion 36 between this partition wall portion 36A and the flange portion 41A of the screw member 41. The thrust bearing 44 receives a thrust load from the screw member 41 together with the partition wall portion 36A, and facilitates a smooth rotation of the screw member 41 relative to the partition wall portion 36A. Further, a seal member 45 is provided on the partition wall portion 36A of the cylinder portion 36 between the partition wall portion 36A and the output shaft 43C of the electric actuator 43. This seal member 45 seals between the partition wall portion 36A and the output shaft 43C so as to prevent the brake fluid in the cylinder portion 36 from leaking toward the electric actuator 43 side.

Further, a piston seal 46 and a dust boot 47 are provided on the opening end side of the cylinder portion 36. The piston seal 46 serves as an elastic seal for sealing between the cylinder portion 36 and the piston 39. The dust boot 47 prevents a foreign object from entering the cylinder portion 36. The dust boot 47 is a flexible bellows-like seal member, and is attached between the opening end of the cylinder portion 36 and an outer periphery of the cover portion 39A side of the piston 39.

The disk brake 5 for the front wheel 2 is configured in an approximately similar manner to the disk brake 31 for the rear wheel 3, except for the parking brake mechanism. In other words, the disk brake 5 for the front wheel 2 does not include the rotation-linear motion conversion mechanism 40, the electric actuator 43, and the like that are activated as the parking brake, which the disk brakes 31 for the rear wheel 3 includes. However, the disk brake 31 equipped with the electric parking brake function may be mounted for the front wheel 2 side, instead of the disk brake 5.

In the embodiment, the brake control apparatus has been described assuming that the hydraulic disk brake 31 including the electric actuator 43 is used as the brake apparatus by way of example. However, the configuration of the brake apparatus does not have to be the brake apparatus according to the above-described embodiment, as long as this configuration is a brake apparatus (a brake mechanism) that can press (advance) the braking member (a pad or a shoe) against the braking target member (a rotor or a drum) based on the driving by an electric actuator (the electric motor) and hold this pressing force. Examples of the applicable brake apparatus include an electric disk brake including an electric caliper, an electric drum brake that applies the braking force by pressing a shoe against a drum with use of an electric actuator, a disk brake equipped with an electric drum-type parking brake, and a brake apparatus such as a cable puller that activates the parking brake for applying the braking by pulling a cable with use of an electric actuator.

The brake apparatus of the four-wheeled automobile according to the embodiment is configured in the above-described manner, and an operation thereof will be described next.

When the driver of the vehicle operates the brake pedal 6 by pressing it, this pressing force is transmitted to the master cylinder 8 via the booster 7, and the brake hydraulic pressure is generated by the master cylinder 8. The hydraulic pressure generated in the master cylinder 8 is distributed and supplied to each of the disk brakes 5 and 31 via the cylinder-side hydraulic pipes 10A and 10B, the ESC 11, and the brake-side pipe portions 12A, 12B, 12C, and 12D, thereby applying the braking force to each of the front left and right wheels 2 and the rear left and right wheels 3.

The disk brake 31 for the rear wheel 3 will be described. The hydraulic pressure is supplied from a hydraulic source (for example, the master cylinder or the like) into the cylinder portion 36 of the caliper 34 via the brake-side pipe portion 12C or 12D. This supply of the hydraulic pressure causes the piston 39 to be slidably displaced in the cylinder portion 36 toward the inner-side brake pad 33 according to an increase in the hydraulic pressure in the cylinder portion 36. As a result, the piston 39 presses the inner-side brake pad 33 against one side surface of the disk rotor 4. A reaction force at this time causes the whole caliper 34 to be slidably displaced toward the inner side relative to each of the above-descried arm portions of the mount member 32.

On the other hand, the outer leg portion (the claw portion 38) of the caliper 34 moves so as to press the outer-side brake pad 33 against the disk rotor 4. As a result, the disk rotor 4 is sandwiched from axial both sides by the pair of brake pads 33. By this operation, the braking force based on the hydraulic pressure is generated. Then, when the brake operation is released, the supply of the hydraulic pressure into the cylinder portion 36 is stopped. This stop causes the piston 39 to be displaced so as to be retracted into the cylinder portion 36. As a result, the inner-side and outer-side brake pads 33 are each separated from the disk rotor 4, whereby the vehicle is returned into a non-braked state.

Next, when the driver of the vehicle operates the parking brake switch 19 toward the braking side, power is supplied from the parking brake control apparatus 20 to the electric actuator 43B of the disk brake 31, whereby the output shaft 43C of the electric actuator 43 is rotationally driven. The disk brake 31 equipped with the electric parking brake function converts the rotational motion of the electric actuator 43 into the linear motion of the linearly movable member 42 via the screw member 41 of the rotation-linear motion conversion mechanism 40 to axially move the linearly movable member 42 to advance the piston 39. As a result, the pair of brake pads 33 are pressed against the both surfaces of the disk rotor 4.

At this time, the linearly movable member 42 is maintained in the braking state with the aid of the frictional force (the holding force) generated between the linearly movable member 42 and the screw member 41 with a pressing reaction force transmitted from the piston 39 serving as a normal force. By this operation, the disk brake 31 for the rear wheel 3 is activated (applied) as the parking brake. In other words, the disk brake 31 is configured in such a manner that, even after the power supply to the electric motor 43B is stopped, the linearly movable member 42 (thus, the piston 39) is held at the braking position by the female screw of the linearly movable member 42 and the male screw of the screw member 41.

On the other hand, when the driver operates the parking brake switch 19 toward the braking release side, power is supplied from the parking brake control apparatus 20 to the electric motor 43B for rotating the motor in the reverse direction. This power supply causes the output shaft 43C of the electric actuator 43 to be rotated in the reverse direction of the direction at the time of the activation (application) of the parking brake. At this time, the holding by the frictional force between the screw member 41 and the linearly movable member 42 is released, and the rotation-linear motion conversion mechanism 40 moves the linearly movable member 42 in a return direction, i.e., into the cylinder portion 36 by a movement amount corresponding to an amount of the reverse rotation of the electric actuator 43. As a result, the braking force of the parking brake (the disk brake 31) is released.

Next, the parking brake control apparatus 20 will be described with reference to FIG. 3.

The parking brake control apparatus 20 as a control portion forms a brake system together with the pair of left and right disk brakes 31 and 31. The parking brake control apparatus 20 includes a calculation circuit (CPU) 21 including a microcomputer and the like, and power is supplied from the battery 14 to the parking brake control apparatus 20 via the power source line 15.

The parking brake control apparatus 20 controls the electric motors 43B and 43B of the disk brakes 31 and 31 on the rear left wheel 3 side and the rear right wheel 3 side to generate the braking force (the parking brake or the auxiliary brake) when the vehicle is parked or stopped (or running as necessary). In other words, the parking brake control apparatus 20 activates (applies or releases) the disk brakes 31 and 31 as the parking brake (the auxiliary brake as necessary) by driving the left and right electric motors 43B and 43B. For this purpose, as illustrated in FIGS. 1 to 3, an input side of the parking brake control apparatus 20 is connected to the parking brake switch 19, and an output side of the parking brake control apparatus 20 is connected to the respective electric motors 43B and 43B of the disk brakes 31 and 31.

The parking brake control apparatus 20 drives the left and right electric motors 43B and 43B to apply (hold) or release (stop applying) the left and right disk brakes 31 and 31 based on the activation request (the application request or the release request) according to the operation performed on the parking brake switch 19 by the driver, the activation request according to the logic for determining the application or release of the parking brake, or the activation request according to the ABS control. At this time, in each of the disk brakes 31 and 31, the pressing member holding mechanism (the rotation-linear motion conversion mechanism 40) holds or releases the piston 39 and the brake pads 33 based on the driving of each of the electric motors 43B. In other words, the parking brake control apparatus 20 functions to serve as the control portion that receives the activation request signal for the activation for holding (applying) or the activation for releasing (stopping applying) the piston 39 (and thus the brake pads 33) according to the operation instruction from the driver, and controls the driving of the electric motors 43B so as to displace the piston 39 (and thus the brake pads 33) according to this activation request signal.

As illustrated in FIG. 3, the parking brake switch 19, the vehicle data bus 16, a voltage sensor portion 23, motor driving circuits 24, current sensor portions 25, and the like, in addition to a memory 22 as a storage portion, are connected to the calculation circuit (CPU) 21 of the parking brake control apparatus 20. The parking brake control apparatus 20 can acquire various kinds of state amounts of the vehicle that are required to control (activate) the parking brake, i.e., various kinds of vehicle information from the vehicle data bus 16.

The parking brake control apparatus 20 may be configured to acquire the vehicle information acquired from the vehicle data bus 16 by a direct connection of the sensor that detects this information to the parking brake control apparatus 20 (the calculation circuit 21 thereof). Further, the calculation circuit 21 of the parking brake control apparatus 20 may be configured in such a manner that the activation request signal based on the above-described determination logic or ABS control is input from another control apparatus (for example, the control unit 13) connected to the vehicle data bus 16. In this case, the brake system can be configured in such a manner that another control apparatus, such as the control unit 13, determines whether to apply/release the parking brake according to the above-described determination logic and controls the ABS, instead of the parking brake control apparatus 20. In other words, the control content of the parking brake control apparatus 20 can be integrated into the control unit 13.

The parking brake control apparatus 20 includes the memory 22 embodied by, for example, a flash memory, a ROM, a RAM, or an EEPROM. The memory 22 stores therein processing programs for performing processing flows illustrated in FIGS. 4 and 5, i.e., a processing program for calculating a running state of the vehicle (whether the vehicle is stopped or running) (FIG. 4) and a program for conducting the application driving or the release driving when the running state cannot be calculated (when the running state is unknown) (FIG. 5), and various kinds of predetermined values (threshold values and/or determination values) for use in these processing programs, in addition to programs for the above-described logic for determining whether to apply or release the parking brake and controlling the above-described ABS. Further, the memory 22 stores (saves) therein the running state of the vehicle, a thrust force generated by the driving of the electric motor 43B (a current value corresponding thereto), a state (ON/OFF) of a flag such as a "thrust force maximum value reaching flag," and the like in a sequentially updatable manner.

In the embodiment, the parking brake control apparatus 20 is configured as a different apparatus from the control unit 13 of the ESC 11, but may be configured integrally with the control unit 13. Further, the parking brake control apparatus 20 is configured to control the two left and right disk brakes 31 and 31, but may be provided for each of the left and right disk brakes 31. In this case, each of the parking brake control apparatuses 20 can also be provided integrally with the disk brake 31.

As illustrated in FIG. 3, the parking brake control apparatus 20 includes, as built-in components thereof, the voltage sensor portion 23 that detects a voltage from the power source line 15, the left and right motor driving circuits 24 and 24 that drive the left and right electric motors 43B and 43B, respectively, the left and right current sensor portions 25 and 25 that detect respective motor currents of the left and right electric motors 43B and 43B, and the like. These voltage sensor portion 22, motor driving circuits 24, and current sensor portions 25 are each connected to the calculation circuit 21.

By this configuration, the calculation circuit 21 of the parking brake control apparatus 20 can, for example, determine whether the disk rotor 4 and the brake pads 33 are in abutment with or separated from each other, determine the thrust force generated by the driving of the electric motors 43B and 43B, and determine whether to stop the driving of the electric motors 43B and 43B (determine completion of the application or determine completion of the release), based on a change in the motor currents of the electric motors 43B and 43B that are detected by the current sensor portions 25 and 25 when applying or releasing the brake.

PTL 1 discusses the technique for activating the ABS when activating the electric parking brake mechanism to use the parking brake as the auxiliary brake while the vehicle is running. However, when a failure in the wheel speed sensor has occurred, the vehicle parking brake apparatus discussed in PTL 1 may be unable to detect the slip rate of the wheel, resulting in the excessive application of the braking force generated by the parking brake while the vehicle is running. At this time, the wheel may be undesirably locked depending on, for example, a state of a road surface on which the vehicle is running. More specifically, PTL 1 fails to take into consideration the control of the application when the running state of the vehicle cannot be calculated, such as when the signal of the wheel speed sensor 18 cannot be acquired from the vehicle data bus 16 (CAN) due to a disconnection or the like, when an abnormality signal indicating a failure in the wheel speed sensor 18 is output from the vehicle data bus 16, and when the signal cannot be output from the wheel speed sensor 18. In the following description, being unable to calculate the running state of the vehicle will be defined to mean being unable to detect the running state about whether the vehicle is running or stopped, and include, for example, being unable to determine the running state, being unable to detect the state amount corresponding to the running state (for example, the vehicle speed or the wheel speed), being unable to acquire the signal corresponding to the running state, and the running state being unknown.

One conceivable measure when the running state cannot be calculated is to handle how the parking brake switch 19 is operated according to handling of how the parking brake switch 19 is operated while the vehicle is running in consideration of a possibility that the parking brake switch 19 may be operated by the driver while the vehicle is running. As one possible configuration therefor, the parking brake apparatus 20 may be configured to drive the electric motor 43B toward the braking side (apply the braking force) while the parking brake switch 19 is operated toward the braking side (while the application request signal is received from the parking brake switch 19), when the running state cannot be calculated.

In this case, the parking brake apparatus 20 may be configured to, for example, drive the electric motor 43B toward the release side (release the braking force) if stopping receiving the application request signal before the thrust force generated by the driving of the electric motor 43B (a force by which the brake pads 33 are pressed against the disk rotor 4, i.e., a pressing force) reaches a predetermined value (for example, a maximum value). As another conceivable measure, the parking brake apparatus 20 may be configured to, for example, perform control of raising (increasing) the thrust force generated by the driving of the electric motor 43B in a stepwise manner to allow the vehicle to be stably stopped (slowed down) even while the vehicle is running. In other words, the parking brake apparatus 20 may be configured to control the electric motor 43B in such a manner that the thrust force of the piston 39 changes at a lower time rate of change when the running state cannot be calculated than when the running state can be calculated. In this case, the parking brake apparatus 20 can prevent or reduce the excessive application of the braking force generated by the parking brake even while the vehicle is running.

On the other hand, it is preferable to take the following point into consideration in the case where the parking brake apparatus 20 is configured to drive the electric motor 43B toward the release side if stopping receiving the application request signal before the thrust force generated by the driving of the electric motor 43B reaches the predetermined value. That is, for example, supposing that the driver operates the parking brake switch 19 toward the braking side with a need for the braking force when the running state cannot be calculated and when the vehicle is running, what happens in this case will be described now. In this case, it is expected that the parking brake apparatus 20 drives the electric motor 43B toward the release side if the driver takes his/her hand off from the parking brake switch 19 by mistake in the middle of operating the parking brake switch 19 toward the braking side (while continuing the operation). This is because the braking force is supposed to be released until the driver operates the parking brake switch 19 toward the braking side again despite the driver's desire for the braking force based on the driving of the electric motor 43B.

Therefore, in the embodiment, the parking brake apparatus 20 includes the running state detection portion that calculates the running state about whether the vehicle is running or stopped, based on the wheel signal according to the rotational state of the wheel (for example, the rear wheel 3). The running state detection portion can be configured to acquire the signal of the wheel speed sensor 18 from the vehicle data bus 16 and calculate the running state (whether the vehicle is running or stopped) based on the acquired signal. The running state may be calculated as the vehicle speed (the running speed) or the wheel speed (the rotational speed) (calculated as a numerical value), or may be calculated as a result ("running" or "stopped") of comparing these numerical values (the speed values) and a determination value (a threshold value for determining whether the vehicle is running or stopped).

Further, the parking brake apparatus 20 starts driving the electric motor 43B toward the application side upon receiving the application request signal from the parking brake switch 19, when the running state cannot be calculated by the running state detection portion (the running state is unknown). After that, the parking brake apparatus 20 performs control of permitting the driving of the electric motor 43B toward the application side and a stop of this driving but prohibiting the driving of the electric motor 43B toward the release side until receiving the release request signal from the parking brake switch 19, even after stopping receiving the application request signal. In other words, the parking brake apparatus 20 drives the electric motor 43B to advance the piston 39 (and thus the brake pads 33) while receiving the application request signal, when the running state cannot be calculated by the running state detection portion. In this case, when stopping receiving the application request signal, the parking brake apparatus 20 performs control of holding the piston 39 (and thus the brake pads 33) with use of the rotation-linear motion conversion mechanism 40 until the application request signal or the release request signal is output next. This control of holding the piston 39 can be implemented as control of maintaining the position (the advanced position) of the piston 39 (and thus the brake pads 33) displaced by the rotation-linear motion conversion mechanism 40 when the reception of the application request signal is stopped without changing it (stopping the drive of the electric motor 43B, not driving the electric motor 43B toward the release side). In other words, the parking brake apparatus 20 stops the electric motor 43B to hold the piston 39 at the position to which the piston 39 is advanced when stopping receiving the application request signal, and maintains the position of the piston with use of the rotation-linear motion conversion mechanism 40 until the application request signal or the release request signal is output.

Figure 4:
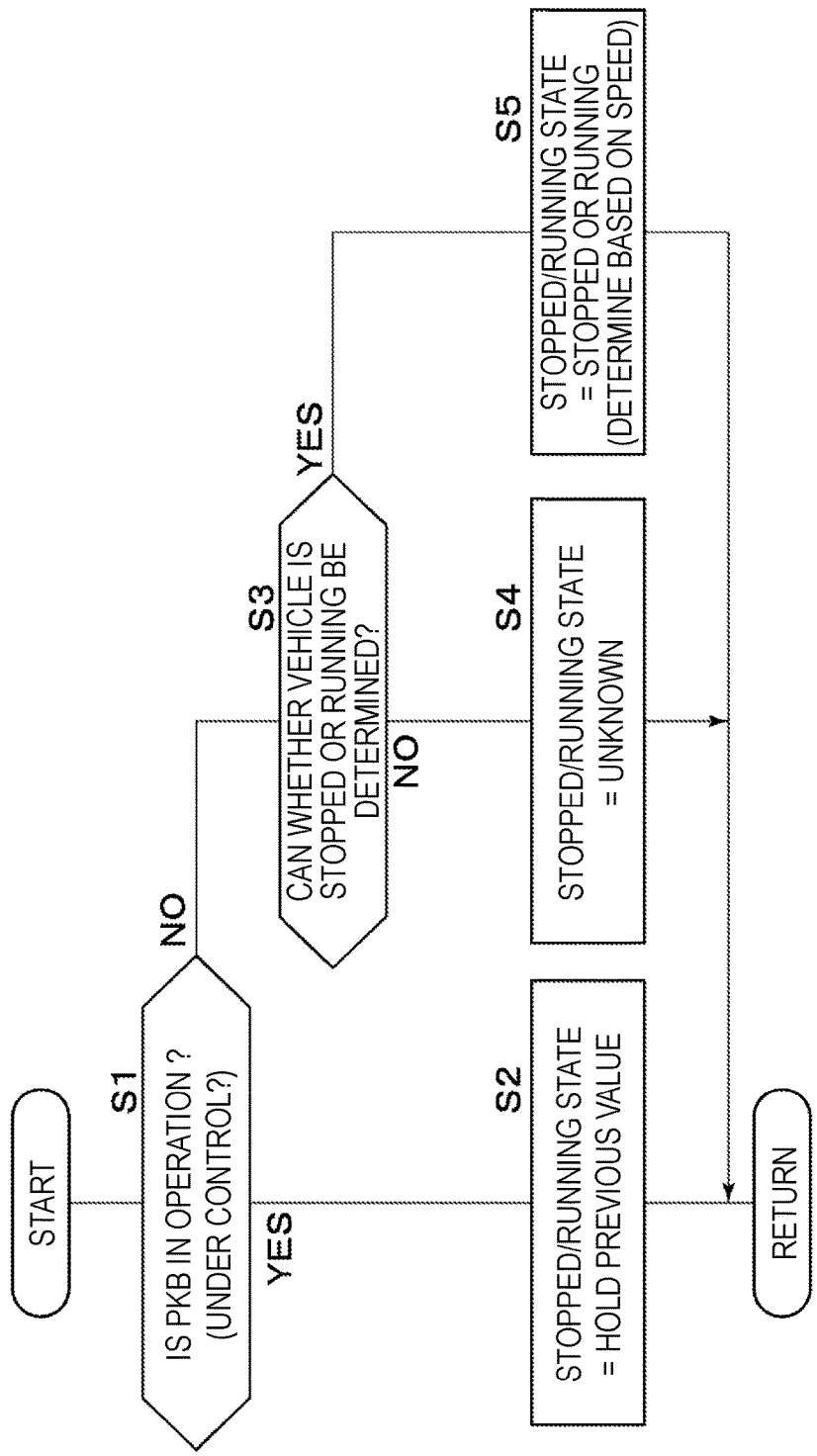
FIG. 4 is a flowchart illustrating processing for calculating a running state of the vehicle.
Figure 5:
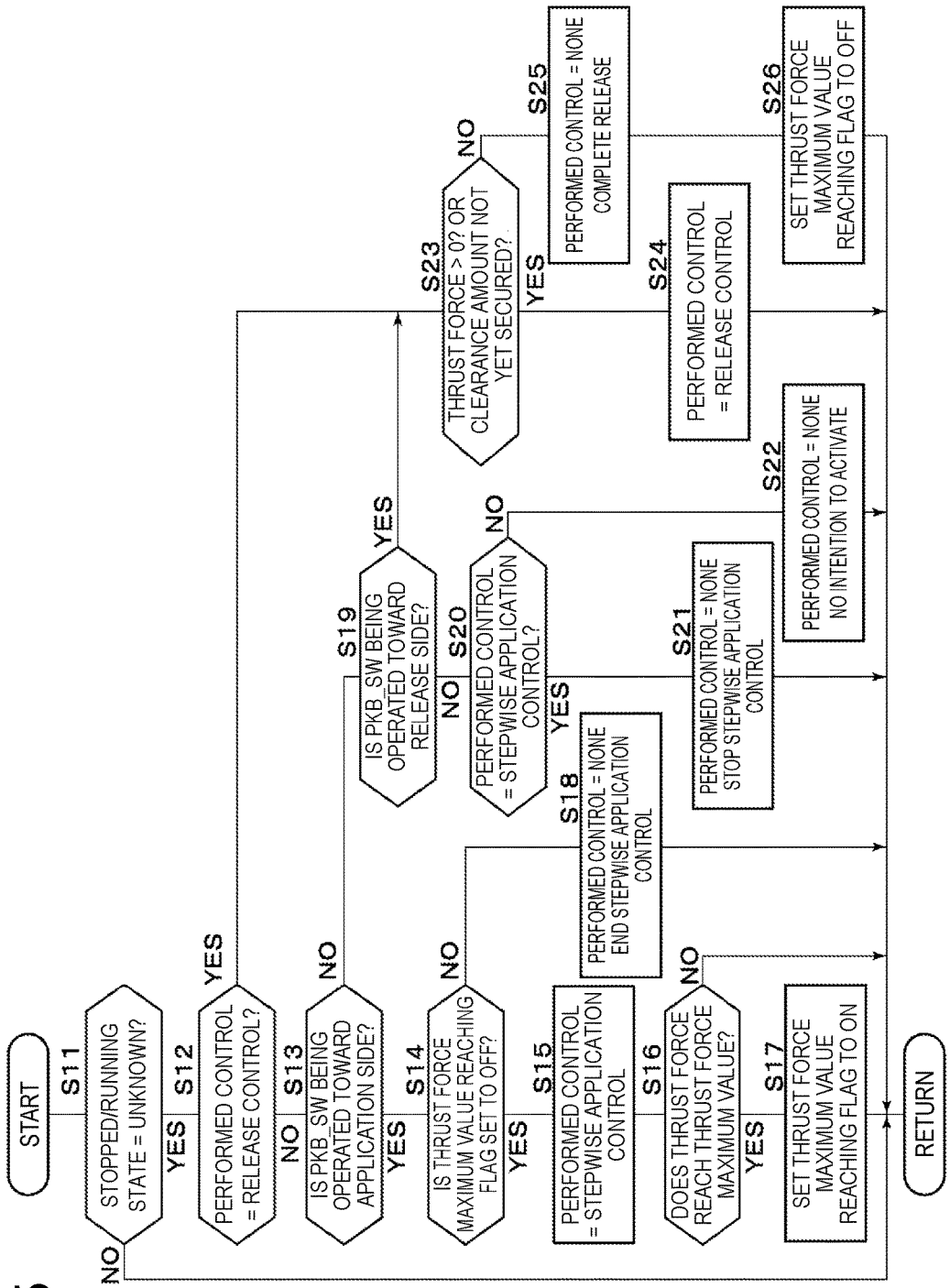
FIG. 5 is a flowchart illustrating control processing when the running state is unknown according to a first embodiment.

Next, the control processing performed by the calculation circuit 21 of the parking brake control apparatus 20 will be described with reference to FIGS. 4 and 5. FIG. 4 illustrates the control processing for calculating the running state of the vehicle (FIG. 4), and FIG. 5 illustrates the control processing when the running state cannot be calculated (when the running state is unknown) (FIG. 5). The control processing illustrated in FIGS. 4 and 5 is repeatedly performed per predetermined control cycle, i.e., for every predetermined time period (for example, 10 ms) while power is supplied to the parking brake control apparatus 20.

First, the processing illustrated in FIG. 4 (the processing for calculating the running state) will be described.

When the control processing illustrated in FIG. 4 is started due to, for example, activation of the parking brake control apparatus 20, in S1, the calculation circuit 21 determines whether the operation (control) of providing (applying) or stopping applying (releasing) the parking brake (the auxiliary brake) is in progress. If the calculation circuit 21 determines "YES" in S1, i.e., determines that the application operation or the release operation is in progress (for example, performed control illustrated in FIG. 5, which will be described below, is "stepwise application control" or "release control"), the processing proceeds to S2, in which the calculation circuit 21 sets the running state of the vehicle (a stopped/running state) to a "previous value". In other words, the calculation circuit 21 holds (maintains) a result ("stopped", "running", or "unknown") of the determination of the running state in the control cycle immediately before the application or the release operation is started. Then, the processing returns (the processing returns to START, and step S1 and the steps subsequent thereto are repeated).

If the calculation circuit 21 determines "NO" in S1, i.e., determines that the application or the release operation is not in progress (for example, the performed control illustrated in FIG. 5, which will be described below, is "none"), the processing proceeds to S3. In S3, the calculation circuit 21 determines whether the running state of the vehicle can be calculated. The calculation circuit 21 can make this determination based on, for example, whether the signal of the wheel speed sensor 18 can be acquired, whether the abnormality signal indicating a failure in the wheel speed sensor 18 is output, or whether the signal is output from the wheel speed sensor 18.

If the calculation circuit 21 determines "NO" in S3, i.e., determines that the running state of the vehicle cannot be calculated, the calculation circuit 21 sets the running state of the vehicle (the stopped/running state) to "unknown". Then, the processing returns. On the other hand, if the calculation circuit 21 determines "YES" in S3, i.e., determines that the running state of the vehicle can be calculated, the calculation circuit 21 calculates the running state (the stopped/running state) of the vehicle based on the rotational speed of the wheel speed sensor 18 at this time. More specifically, the calculation circuit 21 sets the running state (the stopped/running state) of the vehicle to "stopped" or "running" according to the rotational speed at this time. Then, the processing returns.

Next, the processing illustrated in FIG. 5 (the control processing when the running state is unknown) will be described.

When the control processing illustrated in FIG. 5 is started due to, for example, the activation of the parking brake control apparatus 20, in S11, the calculation circuit 21 determines whether the running state (the stopped/running state) of the vehicle is "unknown". For this determination, the calculation circuit 21 uses the current result of the determination of the running state (the stopped/running state) of the vehicle that is yielded by the processing illustrated in FIG. 4. If the calculation circuit 21 determines "NO" in S11, i.e., determines that the running state (the stopped/running state) is not "unknown", i.e., "stopped" or "running", the processing returns (the processing returns to START, and step S11 and steps subsequent thereto are repeated).

On the other hand, if the calculation circuit 21 determines "YES" in S11, i.e., determines that the running state (the stopped/running state) is "unknown", the processing proceeds to S12. In S12, the calculation circuit 21 determines whether the performed control is the release control in progress. If the calculation circuit 21 determines "YES" in S12, i.e., determines that the performed control is the release control in progress, the processing proceeds to S23 to complete this release control. On the other hand, if the calculation circuit 21 determines "NO" in S12, i.e., determines that the current control is the performed control other than the release control, the processing proceeds to S13. In S13, the calculation circuit 21 determines whether the parking brake switch 19 is being operated toward the braking side (the application side). The calculation circuit 21 makes this determination based on whether the parking brake control apparatus 20 is receiving (in the middle of receiving) the application request signal from the parking brake switch 19. If the calculation circuit 21 determines "YES" in S13, i.e., determines that the parking brake switch 19 is being operated toward the application side (the parking brake control apparatus 20 is receiving the application request signal), the processing proceeds to S14.

In S14, the calculation circuit 21 determines whether the "thrust force maximum value reaching flag" is set to OFF. Now, the "thrust force maximum value reaching flag" is a flag set to ON when the thrust force generated by the driving of the electric motor 43B (the force pressing the brake pads 33) reaches a preset predetermined value (a maximum value). The predetermined value can be set as a maximum value of the thrust force (a thrust force maximum value) when the running state of the vehicle cannot be calculated (when the running state is unknown). This maximum value can be set as, for example, the same value as a maximum thrust force value (a full clamp value) when the vehicle is stopped while the running state of the vehicle can be calculated. Alternatively, the maximum value can be set as a smaller value than the full clamp value (that is yet larger than, for example, a thrust force value that allows a deceleration of the vehicle to reach 1.5 m/s$^2$ (hereinafter referred to as a generated thrust force corresponding to 1.5 m/s$^2$), which will be described below). The thrust force maximum value is acquired in advance (set in advance) from an experiment, a simulation, or the like so as to be set to an appropriate value as the maximum value of the thrust force when the running state is unknown, more specifically, a maximum value of the thrust force generated by the stepwise application control (a value that allows a required braking force to be applied regardless of whether the vehicle is running or stopped).

If the parking brake control apparatus 20 determines "YES" in S14, i.e., determines that the "thrust force maximum value reaching flag" is set to OFF (not set to ON), i.e., determines that the thrust force generated by the driving of the electric motor 43B does not reach the preset maximum value, the processing proceeds to S15. In S15, the calculation circuit 21 sets the control to be currently performed to the "stepwise application control" (the performed control=the stepwise application control), and controls the driving of the electric motor 43B toward the application side (continues the driving control toward the application side). More specifically, the calculation circuit 21 performs control of raising (increasing) the thrust force generated by the driving of the electric motor 43B (continues the control) by repeating the driving of the electric motor 43B toward the application side and the stop thereof at a predetermined time interval.

In S16 subsequent to S15, the calculation circuit 21 determines whether the thrust force generated by the driving of the electric motor 43B reaches the preset maximum value. The calculation circuit 21 can determine whether the thrust force reaches the maximum value based on, for example, whether the motor current detected by the current sensor portion 25 reaches a motor current value corresponding to the maximum value (a current value for determining the maximum value). If the calculation circuit 21 determines "NO in S16, i.e., determines that the thrust force does not reach the maximum value, the processing returns without proceeding to S17. On the other hand, if the calculation circuit 21 determines "YES" in S16, i.e., determines that the thrust force reaches the maximum value, the processing proceeds to S17, in which the calculation circuit 21 sets the "thrust force maximum value reaching flag" to ON. Then, the processing returns.

If the calculation circuit 21 determines "NO" in S14, i.e., determines that the "thrust force maximum value reaching flag" is not set to OFF (set to ON), i.e., determines that the thrust force generated by the driving of the electric motor 43B reaches the preset maximum value, the processing proceeds to S18 and then returns. In S18, the calculation circuit 21 set the control to be currently performed to "none" (the performed control=none), and stops the driving of the electric motor 43B (continues stopping the driving).

If the calculation circuit 21 determines "NO" in S13, i.e., determines that the parking brake switch 19 is not being operated toward the application side (the parking brake control apparatus 20 is not receiving the application request signal), the processing proceeds to S19. In S19, the calculation circuit 21 determines whether the parking brake switch 19 is being operated toward the braking release side (the release side). The calculation circuit 21 makes this determination based on whether the parking brake control apparatus 20 is receiving (in the middle of receiving) the release request signal from the parking brake switch 19. If the calculation circuit 21 determines "NO" in S19, i.e., determines that the parking brake switch 19 is not being operated toward the release side, the processing proceeds to S20. This case means that the parking brake switch 19 is not being operated toward neither the application side nor the release side.

In S20, the calculation circuit 21 determines whether the currently performed control, i.e., the control performed in the previous control cycle is the stepwise application control. If the calculation circuit 21 determines "YES" in S20, i.e., determines that the currently performed control is the stepwise application control (the performed control=the stepwise application control), the processing proceeds to S21 and then returns. In S21, the calculation circuit 21 sets the control to be currently performed to "none" (the performed control=none), and stops the electric motor 43B. As a result, the stepwise application control is stopped (suspended), and the position of the piston 39 (and thus the brake pads 33) displaced by the rotation-linear motion conversion mechanism 40 is kept (held) at the position when the electric motor 43B is stopped (the thrust force is maintained).

On the other hand, if the calculation circuit 21 determines "NO" in S20, i.e., determines that the control to be currently performed is not the stepwise application control in progress (the performed control=none), the processing proceeds to S22. In S22, the calculation circuit 21 sets the currently performed control to "none" (the performed control=none) (continues "none").

On the other hand, if the calculation circuit 21 determines "YES" in S19, i.e., determines that the parking brake switch 19 is being operated toward the release side, the processing proceeds to S23. In other words, in the embodiment, if the release control is started in S24, which will be described below, the calculation circuit 21 determines "YES" in the above-described S12, and the processing proceeds to S23.

Therefore, the release control continues until the calculation circuit 21 determines "NO" in S23 (until the thrust force is released). In other words, when the parking brake switch 19 is operated toward the release side, the driving of the electric motor 43B toward the release side continues until the thrust force reduces to zero or a predetermined clearance (space) is secured even if the driver takes his/her hand operating the parking brake switch 19 off from the parking brake switch 19 after that (even if the reception of the release request signal is stopped).

In S23, the calculation circuit 21 determines whether the thrust force is larger than zero or the space between the brake pad 33 and the disk rotor 4 (a clearance amount) is not secured yet. The calculation circuit 21 can determine whether the thrust force is larger than zero based on, for example, whether the motor current detected by the current sensor portion 25 is lower than a motor current value corresponding to the thrust force of zero (a current value for determining the thrust force of zero). The calculation circuit 21 can determine whether the clearance amount is not secured yet based on whether the clearance amount is smaller than a preset predetermined value (a value for determining the clearance amount).

In this case, the clearance amount can be acquired as, for example, a time period during which the electric motor 43B is driven since the thrust force reduces to zero. The clearance amount is acquired in advance (set in advance) from an experiment, a simulation, or the like so as to allow the electric motor 43B to be stopped at an appropriate timing at the time of the release. Further, the calculation circuit 21 may use only one of the thrust force and the clearance amount or may use both the thrust force and the clearance amount, for the determination in S23, i.e., determination about whether to stop the driving of the electric motor 43B at the time of the release. The calculation circuit 21 may be configured to determine "NO" if one of them starts unsatisfying the condition, in the case where the calculation circuit 21 uses both of them. Alternatively, the calculation circuit 21 may be configured to determine "NO" if both of them start unsatisfying the condition.

If the calculation circuit 21 determines "YES" in S23, i.e., determines that the thrust force is larger than zero or the clearance amount between the brake pad 33 and the disk rotor 4 is not secured yet (is smaller than the predetermined value), the processing proceeds to S24 and then returns. In S24, the calculation circuit 21 sets the control to be currently performed to the "release control" (the performed control=the release control), and controls the driving of the electric motor 43B toward the release side (continues the driving control toward the release side).

On the other hand, if the calculation circuit 21 determines "NO" in S23, i.e., determines that the thrust force is zero or the clearance amount between the brake pad 33 and the disk rotor 4 is secured (reaches the predetermined value), the processing proceeds to S25. In S25, the calculation circuit 21 sets the control to be currently performed to "none" (the performed control=none) (continues "none"). Then, the processing proceeds to S26. In S26, the calculation circuit 21 sets the "thrust force maximum value reaching flag" to OFF. Then, the processing returns.

By the above-described processing, in the first embodiment, the parking brake control apparatus 20 can improve stability of the application of the braking force when the running state of the vehicle (whether the vehicle is running or stopped) cannot be calculated.

In other words, according to the embodiment, the parking brake control apparatus 20 stops the electric motor 43B and maintains (holds) the position of the piston 39 (and thus the brake pads 33) displaced by the rotation-linear motion conversion mechanism 40 due to the performed control set to "none" upon stopping receiving the application request signal by the processing in S11, S12, S13, S19, S20, and S21 illustrated in FIG. 5, if the running state is determined to be unable to be calculated, i.e., the stopped/running state is determined to be "unknown" as a result of the processing for calculating the running state illustrated in FIG. 4. This maintenance continues until the application request signal or the release request signal is output next by the processing in S13, S14, and S15 or S19, S23, and S24 illustrated in FIG. 5. Therefore, when the running state cannot be calculated, even if the reception of the application request signal is stopped due to, for example, an operational error made by the driver while the application request signal according to the operation instruction from the driver is received, the piston 39 (and thus the brake pads 33) is held by the rotation-linear motion conversion mechanism 40 at the time of this stop.

In other words, even when the driver takes his/her hand operating the parking brake switch 19 off from the parking brake switch 19 by mistake in the middle of operating the parking brake switch 19 toward the application side (the braking side), the braking force at this time is maintained until the driver operates the parking brake switch 19 toward the application side again or operates the parking brake switch 19 toward the release side (the braking stop side). If the vehicle is running at this time, the "application of the braking force" required by the driver can continue, and, for example, the vehicle can be stopped with a further shorter braking distance. On the other hand, even if the vehicle is stopped, the "application of the braking force" required by the driver can also continue, and the vehicle can be kept stopped. In either case, the stability of the application of the braking force to the vehicle can be improved.

Figure 6:
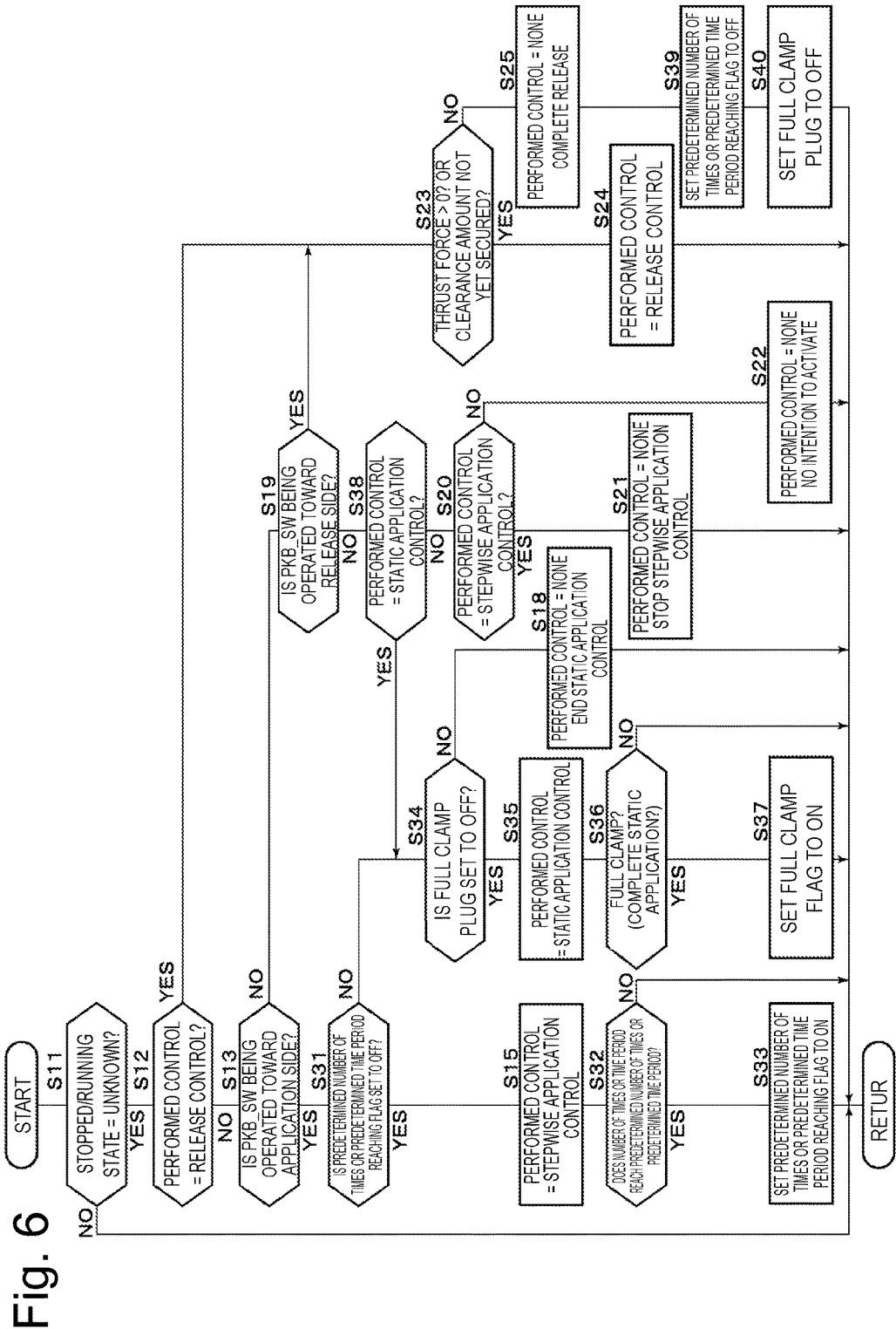
FIG. 6 is a flowchart illustrating control processing when the running state is unknown according to a second embodiment.

Next, FIG. 6 illustrates a second embodiment. The second embodiment is characterized by being configured to perform static application control of continuously (incessantly) keeping driving the electric motor until the thrust force generated by the driving of the electric motor reaches the maximum thrust force value (the full clamp value) when the vehicle is stopped, once the number of times (or a time period elapsed) that the electric motor is driven toward the application side and stopped by the stepwise application control reaches a predetermined number of times (or a predetermined time period). The second embodiment will be described, indicating similar components to the first embodiment by the same reference numerals and omitting descriptions thereof.

In the second embodiment, the parking brake control apparatus 20 switches the control from the stepwise application control to the static application control in the middle of applying the braking force based on the operation on the parking brake switch 19. Now, the stepwise application control is the control of alternately repeating the power supply and the stop of the power supply to the electric motor 43B to raise (increase) the thrust force generated by the driving of the electric motor 43B in the stepwise manner. On the other hand, the static application control corresponds to the application control when the vehicle is stopped, and is control of continuously (incessantly) driving the electric motor 43B by continuing the power supply to the electric motor 43B, thereby continuously raising the thrust force until the thrust force reaches the predetermined thrust force (the full clamp value). In the embodiment, the parking brake control apparatus 20 switches the control to the static application control when the stepwise application control reaches a preset predetermined step, i.e., the stepwise application control progresses until reaching a preset threshold value (the preset number of times or the preset time period). Then, in the static application control, the parking brake control apparatus 20 continuously increases the thrust force until the thrust force reaches the maximum thrust force value (the full clamp value) when the vehicle is stopped.

Processing illustrated in FIG. 6 is used in the second embodiment instead of the processing illustrated in FIG. 5 according to the first embodiment. In FIG. 6, steps in which similar processing to FIG. 5 is performed are indicated by the same numbers. Therefore, descriptions of the steps indicated by the same numbers as FIG. 5 will be omitted here.

If the calculation circuit 21 determines "YES" in S13 and the processing proceeds to S31, in S31, the calculation circuit 21 determines whether a "predetermined number of times or predetermined time period reaching flag" is set to OFF. Now, the "predetermined number of times or predetermined time period reaching flag" is a flag set to ON when the number of times (the elapsed time period) that the electric motor 43B is driven toward the application side and stopped by the stepwise application control reaches the preset predetermined number of times (or the preset predetermined time period). The predetermined number of times (or the predetermined time period) is acquired in advance (set in advance) from an experiment, a simulation, or the like so as to allow the control to be switched from the stepwise application control to the static application control at an appropriate timing when the running state is unknown. Further, for the determination about whether the "predetermined number of times or predetermined time period reaching flag" is set to ON, the calculation circuit 21 may use only one of the number of times that the electric motor 43B is stopped and the elapsed time period, or may use both the number of times that the electric motor 43B is stopped and the elapsed time period. The calculation circuit 21 may be configured to set the flag to ON if one of them satisfies the condition or may be configured to set the flag to ON if both of them satisfy the condition, in the case where both of them are used.

If the calculation circuit 21 determines "YES" in S31, i.e., determines that the "predetermined number of times or predetermined time period reaching flag" is set to OFF, the processing proceeds to S15, in which the calculation circuit 21 starts or continues the stepwise application control. Then, the processing proceeds to S32. In S32, the calculation circuit 21 determines whether the stepwise application control progresses to reach the preset threshold value (the predetermined number of times or the predetermined time period). More specifically, in S32, the calculation circuit 21 determines whether the number of times that (or the elapsed time period) the electric motor 43B is driven toward the application side and stopped by the stepwise application control reaches the preset predetermined number of times (or the predetermined time period).

If the calculation circuit 21 determines "NO" in S32, i.e., determines that the number of times (or the elapsed time period) does not reach the preset number of times (or the preset time period), the processing returns without proceeding to S33. On the other hand, if the calculation circuit 21 determines "YES" in S32, i.e., determined that the number of times (or the elapsed time period) reaches the preset number of times (or the preset time period), the processing proceeds to S33, in which the calculation circuit 21 sets the "predetermined number of times or predetermined time period reaching flag" to ON. Then, the processing returns.

If the calculation circuit 21 determines "NO" in S31, i.e., determines that the "predetermined number of times or predetermined time period reaching flag" is set to ON, the processing proceeds to S34. In S34, the calculation circuit 21 determines whether a "full clamp flag" is set to OFF. Now, the "full clamp flag" is a flag set to ON when the thrust force generated by the driving of the electric motor 43B reaches the full clamp value corresponding to the maximum thrust force value when the vehicle is stopped. The full clamp value is preset as, for example, a thrust force that allows the vehicle to be kept stopped on a predetermined gradient prescribed by the regulations (for example, a 20 to 30% gradient) (for example, a thrust force that can provide a deceleration of 3.0 m/s$^2$ to the vehicle if the vehicle is running).

If the calculation circuit 21 determines "YES" in S34, i.e., determines that the "full clamp flag" is set to OFF, the processing proceeds to S35, in which the calculation circuit 21 sets the control to be currently performed to the "static application control" (the performed control=the static application control), and controls the driving of the electric motor 43B toward the application side (continues the driving control toward the application side). More specifically, the calculation circuit 21 performs the control of continuously raising the thrust force by continuing driving the electric motor 43B (continues the control).

In S36 subsequent to S35, the calculation circuit 21 determines whether the thrust force generated by the static application control reaches the full clamp value. The calculation circuit 21 can determine whether the thrust force reaches the full clamp value based on, for example, whether the motor current detected by the current sensor portion 25 reaches the motor current value corresponding to the full clamp value (the current value for determining the maximum value). If the calculation circuit 21 determines "NO" in S36, i.e., determines that the thrust force does not reach the full clamp value, the processing returns without proceeding to S37. On the other hand, if the calculation circuit 21 determines "YES" in S36, i.e., determines that the thrust force reaches the full clamp value, the processing proceeds to S37, in which the calculation circuit 21 sets the "full clamp flag" to ON. Then, the processing returns.

If the calculation circuit 21 determines "NO" in S19 and the processing proceeds to S38, in S38, the calculation circuit 21 determines whether the currently performed control, i.e., the control performed in the previous control cycle is the static application control. If the calculation circuit 21 determines "YES" in S38, i.e., determines that the currently performed control is the static application control in progress (the performed control=the static application control), the processing proceeds to S34. By this flow, in the second embodiment, once the static application control is started (once the control is switched from the stepwise application control to the static application control), the static application control continues even if the calculation circuit 21 determines "NO" in S13 (even if the reception of the application request signal is stopped) before the calculation circuit 21 determines "YES" in S34 (before the "full clamp plug" is set to ON), unless the calculation circuit 21 determines "YES" in S19 (unless the release request signal is received). In other words, once the stepwise application control reaches the preset threshold value (the predetermined number of times or the predetermined time period) (the "predetermined number of times or predetermined time period reaching flag" is set to ON) and the static application control is started, the thrust force generated by the electric motor 43B increases to reach the predetermined value (the full clamp value) and is held at this braking force until the release request signal is received.

On the other hand, if the calculation circuit 21 determines "NO" in S38, i.e., determines that the currently performed control is not the static application control in progress (the performed control=the stepwise application control or the performed control=none), the processing proceeds to S20. In S39 subsequent to S25, the calculation circuit 21 sets the "predetermined number of times or predetermined time period reaching flag" to OFF. Then, in step S40 subsequent to S39, the calculation circuit 21 sets the "full clamp flag" to OFF. Then, the processing returns.

The second embodiment is such an embodiment that the static application control is started by the processing in S34 and S35 if the calculation circuit 21 determines that the stepwise application control reaches the preset threshold value (the predetermined number of times or the predetermined time period) (the "predetermined number of times or predetermined time period reaching flag" is set to ON) by the processing in S31 as describe above, and basic effects thereof are not especially different from the effects brought about by the first embodiment.

Especially, in the second embodiment, the parking brake control apparatus 20 performs the static application control of continuously (incessantly) keeping driving the electric motor 43B until the thrust force generated by the driving of the electric motor 43B reaches the maximum thrust force value when the vehicle is stopped (the full clamp value), once the number of times (or the elapsed time period) that the electric motor 43B is driven toward the application side and stopped by the stepwise application control reaches the preset number of times (or the preset time period). Therefore, when the control is switched from the stepwise application control to the static application control, the thrust force increases at a higher speed, which can reduce a time period taken until the thrust force reaches the target thrust force (the full clamp value).

In S35 according to the second embodiment, the calculation circuit 21 sets the performed control to the static application control, but may set the performed control to the stepwise application control. In this case, S38 may be performed without being modified (or may be omitted). Alternatively, S38 may be modified into processing for determining whether the currently performed control, i.e., the control performed in the previous control cycle is the stepwise application control.

Figure 7:
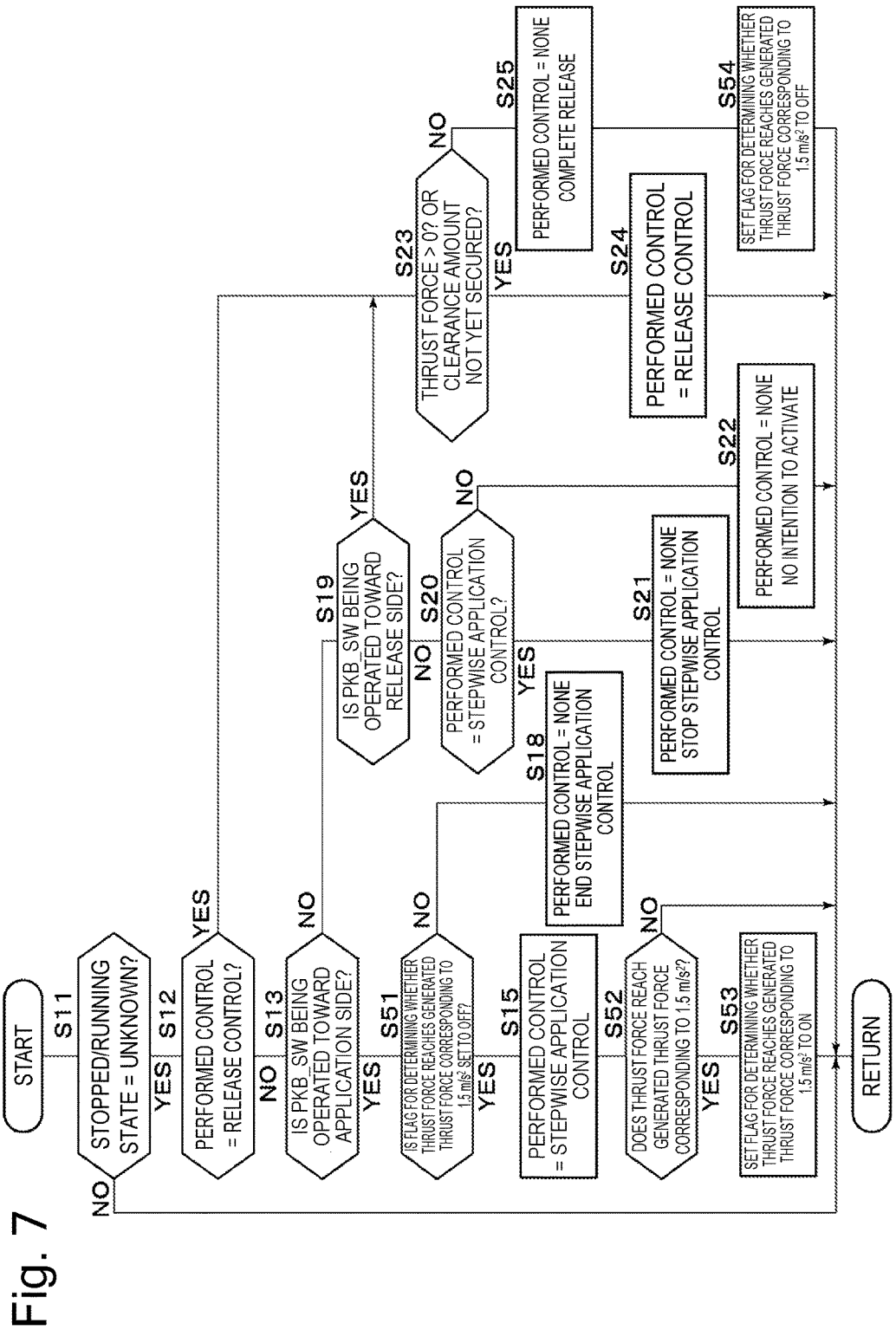
FIG. 7 is a flowchart illustrating control processing when the running state is unknown according to a third embodiment.

Next, FIG. 7 illustrates a third embodiment. The third embodiment is characterized in that the maximum value of the thrust force generated by the electric motor when the running state cannot be calculated is set to a thrust force that can provide a deceleration of 1.5 m/s$^2$ to the vehicle if the vehicle is running. The third embodiment will be described, indicating similar components to the first embodiment by the same reference numerals and omitting descriptions thereof.

In the third embodiment, the parking brake control apparatus 20 sets the maximum value of the thrust force generated by the driving of the electric motor 43B when the running state cannot be calculated to the thrust force that can provide the deceleration of 1.5 m/s$^2$ to the vehicle if the vehicle is running.

Processing illustrated in FIG. 7 is used in the third embodiment instead of the processing illustrated in FIG. 5 according to the first embodiment. In FIG. 7, similar steps in which similar processing to FIG. 5 is performed are indicated by the same numbers. Therefore, descriptions of the steps indicated by the same numbers as FIG. 5 will be omitted here.

If the calculation circuit 21 determines "YES" in S13 and the processing proceeds to S51, in S51, the calculation circuit 21 determines whether a "flag for determining whether the thrust force reaches the generated thrust force corresponding to 1.5 m/s$^2$" to OFF. Now, the "flag for determining whether the thrust force reaches the generated thrust force corresponding to 1.5 m/s$^2$" is a flag set to ON when the thrust force generated by the driving of the electric motor 43B reaches the thrust force that can provide the deceleration of 1.5 m/s$^2$ to the vehicle. Then, the thrust force that can provide the deceleration of 1.5 m/s$^2$ corresponds to, for example, a trust force approximately half the full clamp value, and is acquired in advance (set in advance) from an experiment, a simulation, or the like.

If the calculation circuit 21 determines "YES" in S51, i.e., determines that the "flag for determining whether the thrust force reaches the generated thrust force corresponding to 1.5 m/s$^2$" is set to OFF, the processing proceeds to S15, in which the calculation circuit 21 starts or continues the stepwise application control. Then, the processing proceeds to S52. In S52, the calculation circuit 21 determines whether the thrust force generated by the driving of the electric motor 43B reaches the thrust force that can provided the deceleration of 1.5 m/s$^2$ to the vehicle (the generated thrust force corresponding to 1.5 m/s$^2$). The calculation circuit 21 can determine whether the thrust force reaches the generated thrust force corresponding to 0.15 G based on, for example, whether the motor current detected by the current sensor portion 25 reaches a motor current value corresponding to the generated thrust force corresponding to 1.5 m/s$^2$ (a current value for determining the generated thrust force corresponding to 1.5 m/s$^2$).

If the calculation circuit 21 determines "NO" in S52, i.e., determines that the thrust force generated by the driving of the electric motor 43B does not reach the generated thrust force corresponding to 1.5 m/s$^2$, the processing returns without proceeding to S53. On the other hand, if the calculation circuit 21 determines "YES" in S52, i.e., determines that the thrust force reaches the generated thrust force corresponding to 1.5 m/s$^2$, the processing proceeds to S53, in which the calculation circuit 21 sets the "flag for determining whether the thrust force reaches the generated thrust force corresponding to 1.5 m/s$^2$" to ON. Then, the processing returns. In S54 subsequent to S25, the calculation circuit 21 sets the "flag for determining whether the thrust force reaches the generated thrust force corresponding to 1.5 m/s$^2$" to OFF. Then, the processing returns.

The third embodiment is such an embodiment that the stepwise application control is ended (the driving of the electric motor 43B is stopped) to maintain the braking force by the processing in S18 if the calculation circuit 21 determines that the thrust force generated by the driving of the electric motor 43B reaches the generated thrust force corresponding to 1.5 m/s$^2$ (the "flag for determining whether the thrust force reaches the generated thrust force corresponding to 1.5 m/s$^2$" is set to ON) by the processing in S51 as describe above, and basic effects thereof are not especially different from the effects brought about by the first embodiment.

Especially, in the third embodiment, the maximum value of the thrust force generated by the driving of the electric motor 43B when the running state cannot be calculated is set to the thrust force that can provide the deceleration of 1.5 m/s$^2$ to the vehicle if the vehicle is running. Then, the thrust force that can provide the deceleration of 1.5 m/s$^2$ to the vehicle is a thrust force that can stop the vehicle if the vehicle is running, and a thrust force that can keep the vehicle stopped on the predetermined gradient even when the vehicle is stopped under bad conditions as conditions including a state of a road surface and the like (even when the vehicle is stopped under undesirable conditions for keeping the vehicle stopped, for example, a low frictional coefficient of the road surface, a low frictional coefficient of the brake pads 33, and a low temperature) if the vehicle is stopped. Therefore, the parking brake control apparatus 20 can provide a braking force required to stop the vehicle or keep the vehicle stopped regardless of whether the vehicle is running or stopped, when the running state cannot be calculated.

Figure 8:
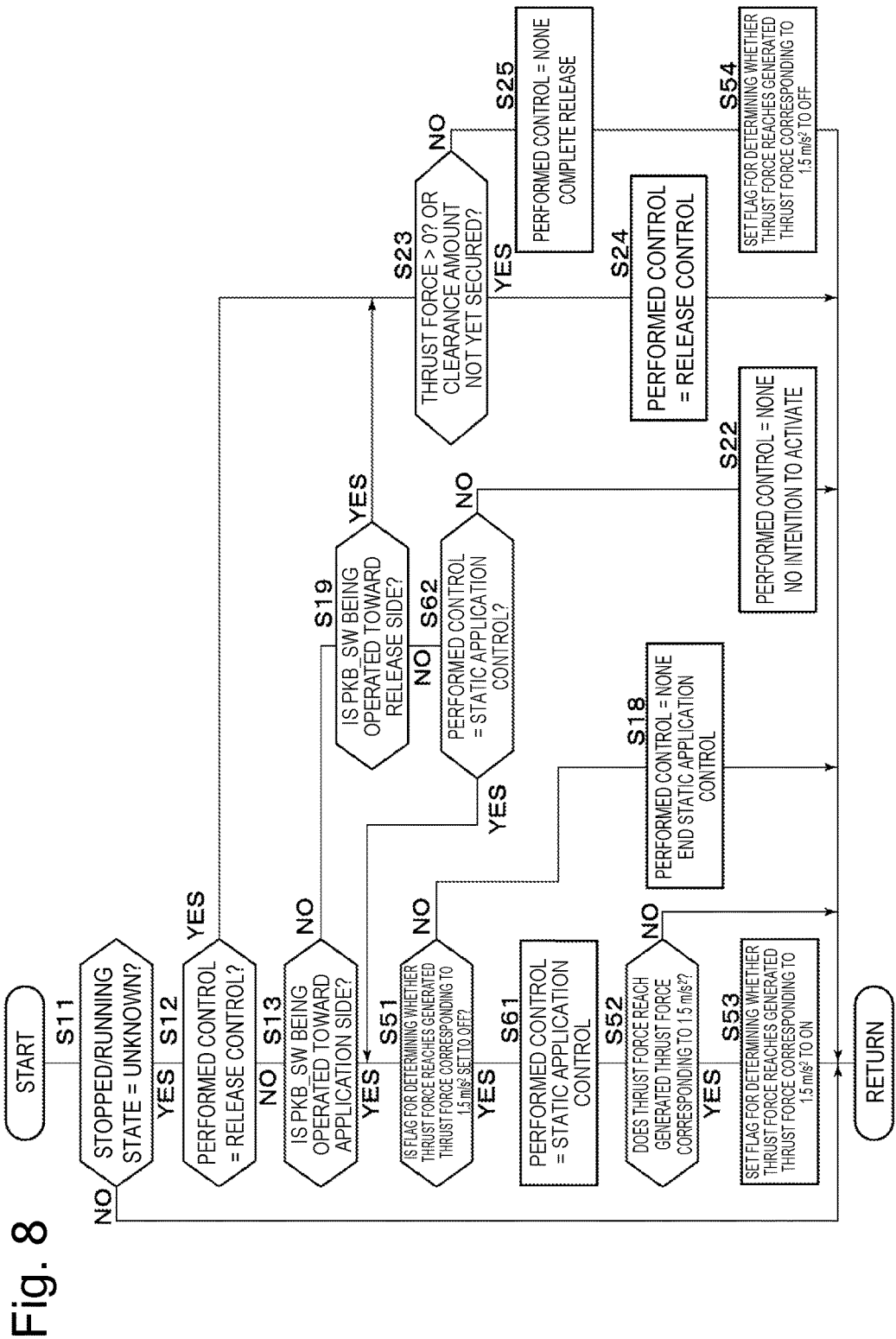
FIG. 8 is a flowchart illustrating control processing when the running state is unknown according to a fourth embodiment.

Next, FIG. 8 illustrates a fourth embodiment. The fourth embodiment is characterized by being configured to, upon receiving the activation request signal for the holding activation, (continuously) increase the pressing force of the braking member until this pressing force reaches a preset predetermined value and keep this pressing force at a predetermined value, until the activation request signal for the release activation is received next. The fourth embodiment will be described, indicating similar components to the first and third embodiments by the same reference numerals and omitting descriptions thereof.

In the fourth embodiment, the parking brake control apparatus 20 performs control of, upon receiving the application request signal from the parking brake switch 19, increasing the pressing force of the brake pads 33 (the thrust force generated by the driving of the electric motor 43B) until this pressing force reaches the preset predetermined value (the thrust force that can provide the deceleration of 1.5 m/s$^2$ to the vehicle), and, after that, stopping the electric motor 43B and holding the piston 39 with use of the rotation-linear motion conversion mechanism 40, until receiving the release request signal next regardless of the reception state of this application activation request. Further, in the fourth embodiment, the parking brake control apparatus 20 applies the braking force by the static application control of continuing the power supply to the electric motor 43B to thereby continuously (incessantly) drive the electric motor 43B to continuously raise the thrust force (does not perform the stepwise application control).

Processing illustrated in FIG. 8 is used in the fourth embodiment instead of the processing illustrated in FIG. 5 according to the first embodiment. In FIG. 8, similar steps in which similar processing to FIGS. 5 and 7 is performed are indicated by the same numbers. Therefore, descriptions of the steps indicated by the same numbers as FIGS. 5 and 7 will be omitted here.

If the calculation circuit 21 determines "YES" in S51 and the processing proceeds to S61, in S61, the calculation circuit 21 sets the control to be currently performed to the static application control (the performed control=the static application control), and controls the driving of the electric motor 43B toward the application side (continues the driving control toward the application side). More specifically, the calculation circuit 21 performs the control of continuously raising the thrust force (continuing the control) by keeping driving the electric motor 43B. In the fourth embodiment, the stepwise application control is not performed. In S52 subsequent to S61, the calculation circuit 21 determines whether the thrust force generated by the driving of the electric motor 43B reaches the thrust force that can provided the deceleration of 1.5 m/s$^2$ to the vehicle (the generated thrust force corresponding to 1.5 m/s$^2$), similarly to the third embodiment.

On the other hand, if the calculation circuit 21 determines "NO" in S19, the processing proceeds to S62. In S62, the calculation circuit 21 determines whether the currently performed control, i.e., the control performed in the previous control cycle is the static application control. If the calculation circuit 21 determines "YES" in S62, i.e., determines that the currently performed control is the static application control in progress (the performed control=the static application control), the processing proceeds to S51. On the other hand, if the calculation circuit 21 determines "NO" in S62, i.e., determines that the currently performed control is not the static application control in progress (the performed control=none), the processing proceeds to S22.

The fourth embodiment is such an embodiment that, once the static application control is started by the processing in S13, S51, and S61, the parking brake control apparatus 20 increases the thrust force generated by the driving of the electric motor 43B to the generated thrust force corresponding to 1.5 m/s$^2$ and then holds (maintains) this thrust force, until receiving the release request signal by the processing in S13, S19, and S62 (until the calculation circuit 21 determines "YES" in S19) as described above, and basic effects thereof are not especially different from the effects brought about by the first and third embodiments.

Especially, in the fourth embodiment, upon receiving the application request signal, the parking brake control apparatus 20 performs the control of increasing the pressing force (the thrust force) until the pressing force reaches the preset predetermined value (the value that can provide the deceleration of 1.5 m/s$^2$ to the vehicle) and then holding the piston 39 (and thus the brake pads 33) until receiving the release request signal next regardless of the reception state of this application request signal. Therefore, when the running state cannot be calculated, the pressing force (the thrust force) is held after being increased to the preset predetermined value even if the reception of the application request signal is stopped due to, for example, an operational error made by the driver when the application request signal according to the operation instruction from the driver is received.

In other words, the braking force is increased to the predetermined value (the value that can provide the deceleration of 1.5 m/s$^2$ to the vehicle) and is kept at the predetermined value until the driver operates the parking brake switch 19 toward the release side, even if the driver takes his/her hand operating the parking brake switch 19 off from the parking brake switch 19 by mistake in the middle of operating the parking brake switch 19 toward the application side. Therefore, regardless of whether the vehicle is running or stopped, the "application of the braking force" required by the driver can continue, and the stability of the application of the braking force to the vehicle can be improved.

In the fourth embodiment, the parking brake control apparatus 20 has been described as being configured to apply the braking force by the static application control by way of example. However, the application of the braking force is not limited thereto, and, for example, the braking force may be applied by the stepwise application control. More specifically, the processing in S61 illustrated in FIG. 8 may be modified into processing for performing the stepwise application control similarly to the processing in S15 (FIG. 5) according to the first embodiment, the processing in S18 illustrated in FIG. 8 may be modified into processing for ending the stepwise application control similarly to the processing in S18 (FIG. 5) according to the first embodiment, and the processing in S62 illustrated in FIG. 8 may be modified into processing for determining whether the performed control is the stepwise application control. Further, in the case where the parking brake control apparatus 20 is configured to apply the braking force by the stepwise application control in this manner, the processing in S52, S53, and S54, i.e., the processing for determining whether the thrust force reaches the generated thrust force corresponding to 1.5 m/s$^2$ and the processing for setting the flag thereof to ON/OFF may be modified into the processing in S16, S17, and S26 (FIG. 5) according to the first embodiment, i.e., the processing for determining whether the thrust force reaches the thrust force maximum value (for example, the full clamp value) and the processing for setting the flag thereof to ON/OFF.

Figure 9:
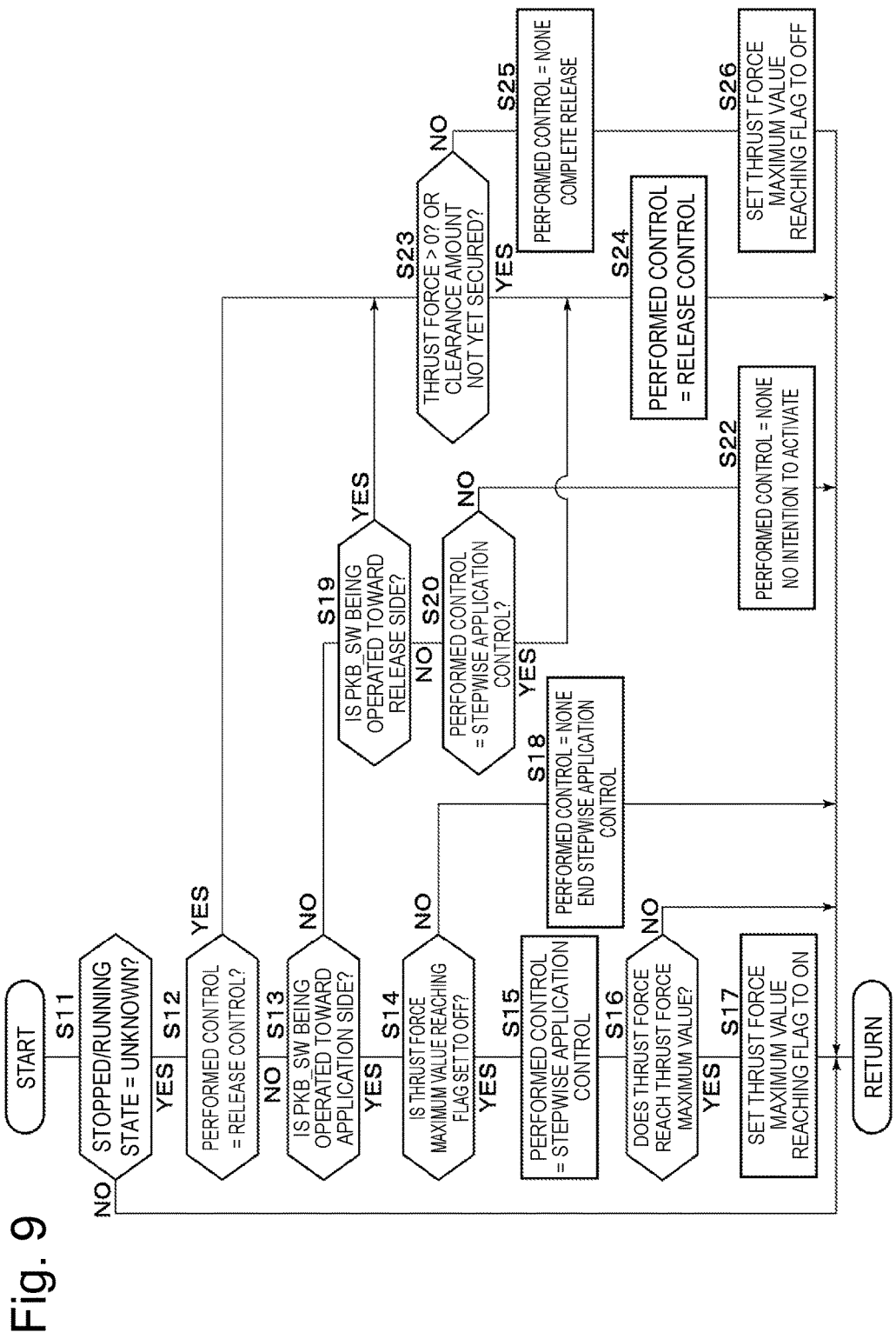
FIG. 9 is a flowchart illustrating control processing when the running state is unknown according to a fifth embodiment.
Figure 10:
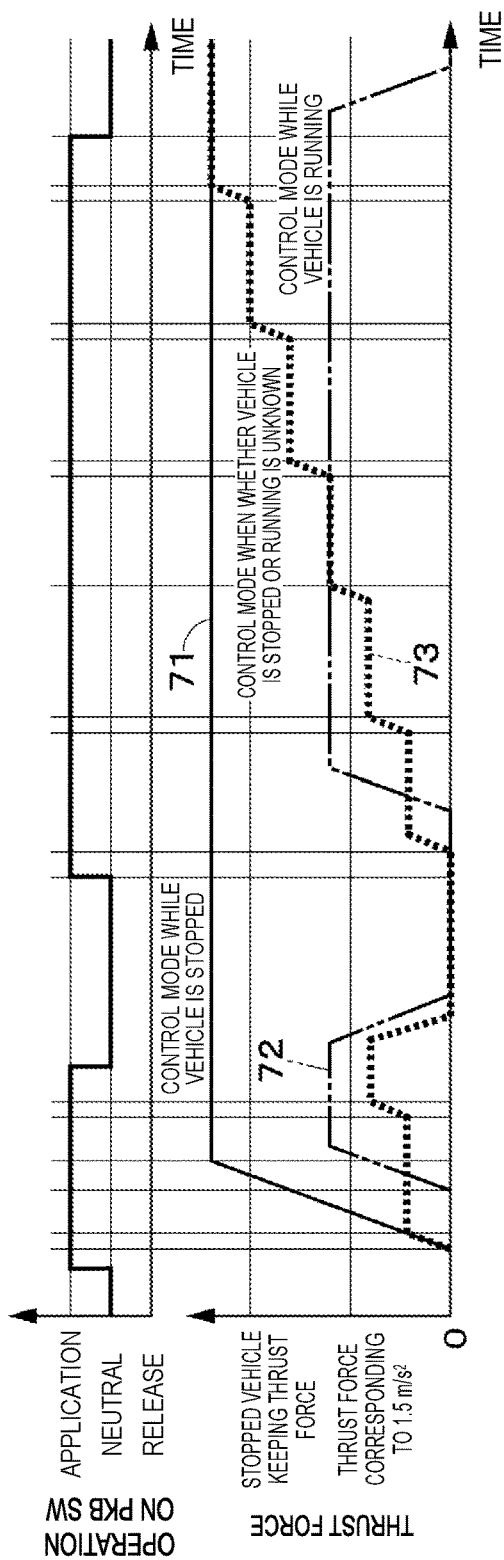
FIG. 10 illustrates characteristic lines indicating one example of changes in an operation on a parking brake switch and a thrust force over time according to the fifth embodiment.

Next, FIGS. 9 and 10 illustrate a fifth embodiment. The fifth embodiment is characterized by being configured to release the thrust force of the pressing member if the reception of the activation request signal for the holding activation is stopped before the strength of the thrust force of the pressing member reaches the predetermined thrust force value. The fifth embodiment will be described, indicating similar components to the first embodiment by the same reference numerals and omitting descriptions thereof.

First, in the above-described first embodiment, the parking brake control apparatus 20 is configured to stop the electric motor 43B and maintain the position of the piston 39 when stopping receiving the application request signal. Then, a characteristic line diagram illustrated in FIG. 11 and a characteristic line diagram illustrated in FIG. 12 each illustrate changes in the operation on the parking brake switch 19 and the thrust force over time according to the first embodiment. The characteristic line diagram illustrated in FIG. 11 of them illustrates changes when the parking brake switch 19 is continuously operated toward the application side.

Figure 11:
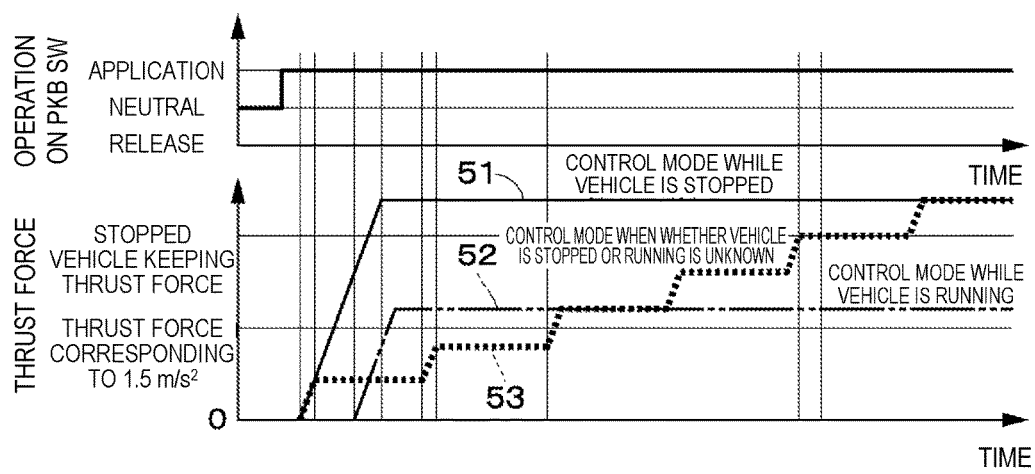
FIG. 11 illustrates characteristic lines indicating one example of changes in the operation on the parking brake switch and the thrust force over time according to the first embodiment.

In FIG. 11, a characteristic line 51 indicated by a solid line and a characteristic line 52 indicated by an alternate long and two short dashes line each correspond to a change in the thrust force when the running state of the vehicle can be calculated. The characteristic line 51 corresponds to a change in the thrust force when the vehicle is determined to be stopped. In this case, when the parking brake switch 19 is operated toward the application side, the thrust force increases due to the driving of the electric motor 43B toward the application side. Then, when the thrust force reaches, for example, a stopped vehicle keeping thrust force that can keep the vehicle stopped on the predetermined gradient prescribed by the regulations (for example, the full clamp value), the driving of the electric motor 43B is stopped. As a result, the thrust force is kept at the stopped vehicle keeping thrust force or larger. The stopped vehicle keeping thrust force corresponds to a thrust force value (the full clamp value or the maximum thrust force value) when the running state of the vehicle can be calculated and when the vehicle is detected to be stopped. This thrust force value is stored in the memory 22 of the parking brake control apparatus 20 together with the other determination values and threshold values (for example, the generated thrust force corresponding to 1.5 m/s$^2$ or the like).

On the other hand, the characteristic line 52 corresponds to a change in the thrust force when the vehicle is determined to be running. In this case, when the parking brake switch 19 is operated toward the application side, the thrust force increases due to the driving of the electric motor 43B toward the application side. Then, when the thrust force reaches, for example, the generated thrust force corresponding to 1.5 m/s$^2$, which corresponds to a thrust force capable of generating a predetermined vehicle deceleration prescribed by the regulations when the vehicle is running, the driving of the electric motor 43B is stopped. As a result, the thrust force is kept at the generated thrust force corresponding to 1.5 m/s$^2$ or larger.

On the other hand, a characteristic line 53 indicated by a broken line in FIG. 11 corresponds to a change in the thrust force when the running state of the vehicle cannot be calculated. In this case, when the parking brake switch 19 is operated toward the application side, the thrust force increases in the stepwise manner due to the electric motor 43B being repeatedly driven toward the application side and stopped at the predetermined time interval during that. Then, when the thrust force reaches, for example, the stopped vehicle keeping thrust force, the driving of the electric motor 43B is stopped. As a result, the thrust force is kept at the stopped vehicle keeping thrust force or larger.

In this manner, according to the first embodiment, the parking brake control apparatus 20 controls the electric motor 43B so as to change the thrust force of the piston 39 in the stepwise manner when the running state cannot be calculated. In other words, the parking brake control apparatus 20 controls the electric motor 43B in such a manner that the thrust force of the piston 39 changes at a lower time rate of change (or the thrust force of the piston 39 is generated at a lower speed) when the running state cannot be calculated than when the running state can be calculated. In this case, the parking brake control apparatus 20 increases the strength of the thrust force of the piston 39 according to an increase in a time period for which the application request signal is received.

The control of changing the thrust force of the piston 39 in the stepwise manner can be implemented as control of periodically (intermittently) supplying power to the electric motor 43B, i.e., control of repeating the power supply and the stop of the power supply. In this case, time periods of the power supply and the stop of the power supply are acquired in advance from an experiment, a simulation, or the like so as to prevent the thrust force from being excessively applied (prevent the wheel from being locked) even while the vehicle is running. In other words, the time rate of change in the thrust force of the piston 39 when the running state cannot be calculated can be set so as to become a time rate of change that prevents the thrust force from being excessively applied even while the vehicle is running.

Figure 12:
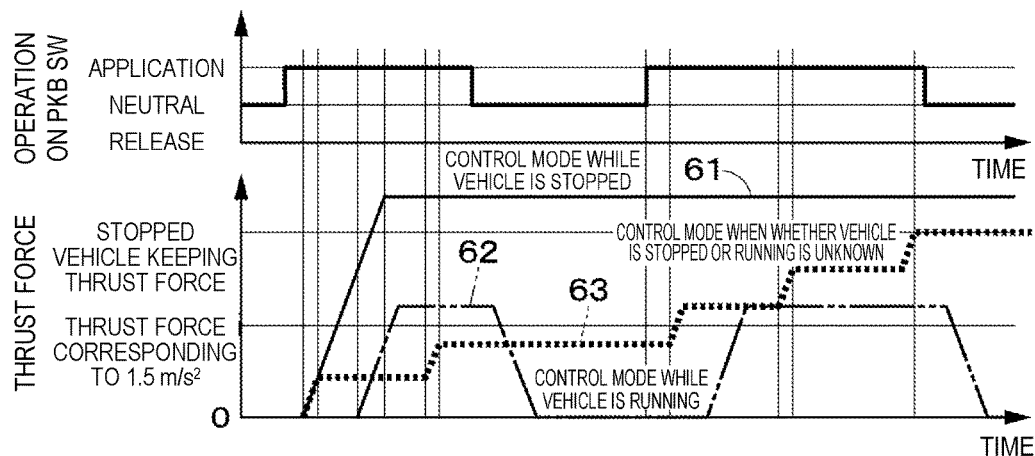
FIG. 12 illustrates characteristic lines indicating another example of the changes in the operation on the parking brake switch and the thrust force over time according to the first embodiment.

Next, a characteristic line diagram illustrated in FIG. 12 indicates a change when the parking brake switch 19 is temporarily returned to a neutral position in the middle of being continuously operated toward the application side. In FIG. 12, a characteristic line 61 indicated by a solid line and a characteristic line 62 indicated by an alternate long and two short dashes line each correspond to a change in the thrust force when the running state of the vehicle can be calculated. The characteristic line 61 corresponds to a change in the thrust force when the vehicle is determined to be stopped. In this case, when the parking brake switch 19 is operated toward the application side, the thrust force increases due to the driving of the electric motor 43B toward the application side. When the thrusts force reaches the stopped vehicle keeping thrust force, the driving of the electric motor 43B is stopped. After that, the electric motor 43B is kept stopped even when the parking brake switch 19 is returned to the neutral position and is operated toward the application side again. In other words, the thrust force is kept at the stopped vehicle keeping thrust force or larger.

On the other hand, the characteristic line 62 corresponds to a change in the thrust force when the vehicle is determined to be running. In this case, when the parking brake switch 19 is operated toward the application side, the thrust force increases due to the driving of the electric motor 43B toward the application side. Then, when the thrust force reaches the generated thrust force corresponding to 1.5 m/s$^2$, the driving of the electric motor 43B is stopped. After that, when the parking brake switch 19 is returned to the neutral position, the thrust force reduces due to the driving of the electric motor 43B toward the release side and is released. Then, when the parking brake switch 19 is operated toward the application side again, the thrust force increases due to the driving of the electric motor 43B toward the application side, and is kept at the generated thrust force corresponding to 1.5 m/s$^2$ or larger.

On the other hand, a characteristic line 63 indicated by a broken line in FIG. 12 corresponds to a change in the thrust force when the running state of the vehicle cannot be calculated. In this case, when the parking brake switch 19 is operated toward the application side, the thrust force increases in the stepwise manner due to the electric motor 43B being repeatedly driven toward the application side and stopped at the predetermined time interval. Then, when the parking brake switch 19 is returned to the neutral position, the driving the electric motor 43B is stopped and the thrust force at this time is maintained. When the parking brake switch 19 is operated toward the application side again, the thrust force increases in the stepwise manner. When the thrust force reaches the stopped vehicle keeping thrust force, the driving of the electric motor 43B is stopped. As a result, the thrust force is kept at the stopped vehicle keeping force or larger.

In this manner, in the first embodiment, the parking brake control apparatus 20 advances the piston 39 by driving the electric motor 43B while receiving the application request signal, when the running state cannot be calculated. Then, when stopping receiving the application request signal, the parking brake control apparatus 20 stops the electric motor 43B and maintains the thrust force of the piston 39. Further, when the strength of the thrust force of the piston 39 reaches the stopped vehicle keeping thrust force that is the predetermined thrust force, the parking brake control apparatus 20 keeps the thrust force of the piston 39 at this stopped vehicle keeping thrust force, and also keeps the thrust force of the piston 39 at the stopped vehicle keeping thrust force even after stopping receiving the application request signal.

Unlike the first embodiment configured in this manner, in the fifth embodiment, the parking brake control apparatus 20 is configured to release the thrust force of the piston 39 if stopping receiving the application request signal before the strength of the thrust force of the piston 39 reaches the stopped vehicle keeping thrust force that is the predetermined thrust force value. Therefore, in the fifth embodiment, if the calculation circuit 21 determines "YES" in S20, the processing proceeds to S24 as illustrated in FIG. 9.

A characteristic line diagram illustrated in FIG. 10 indicates changes in the operation on the parking brake switch 19 and the thrust force over time according to the fifth embodiment. In FIG. 10, a characteristic line 71 indicated by a solid line and a characteristic line 72 indicated by an alternate long and two short dashes line each correspond to a change in the thrust force when the running state of the vehicle can be calculated. The characteristic line 71 of them corresponds to a change in the thrust force when the vehicle is determined to be stopped, and the characteristic line 72 corresponds to a change in the thrust force when the vehicle is determined to be running.

On the other hand, a characteristic line 73 indicated by a broken line in FIG. 10 corresponds to a change in the thrust force when the running state of the vehicle cannot be calculated. In this case, when the parking brake switch 19 is operated toward the application side, the thrust force increases in the stepwise manner due to the electric motor 43B being repeatedly driven toward the application side and stopped at the predetermined time interval. Then, when the parking brake switch 19 is returned to the neutral position before the thrust force reaches the stopped vehicle keeping thrust force, the thrust force reduces due to the driving of the electric motor 43B toward the release side and is released. When the parking brake switch 19 is operated toward the application side again, the thrust force increases from the released state in the stepwise manner. Then, when the thrust force reaches the stopped vehicle keeping thrust force, the driving of the electric motor 43B is stopped. As a result, the thrust force is kept at the stopped vehicle keeping thrust force or larger.

In this manner, in the fifth embodiment, the parking brake control apparatus 20 releases the thrust force of the piston 39 if stopping receiving the application request signal before the parking brake control apparatus 20 drives the electric motor 43B to advance the piston 39 and the thrust force of this piston 39 reaches the stopped vehicle keeping thrust force that is the predetermined thrust force value. The predetermined thrust force value may be set to the generated thrust force corresponding to 1.5 m/s$^2$.

The fifth embodiment is such an embodiment that the parking brake control apparatus 20 releases the thrust force if stopping receiving the application request signal before the thrust force reaches the stopped vehicle keeping thrust force due to the above-described configuration, i.e., by the processing proceeding to S24 when the calculation circuit 21 determines "YES" in S20, and basic effects thereof are not especially different from those brought about by the first embodiment. Especially, in the fifth embodiment, the driver can release the thrust force by returning the parking brake switch 19 to the neutral position even without operating the parking brake switch 19 toward the release side, before the thrust force reaches the vehicle stopped keeping thrust force.

In the above-described third embodiment, the maximum value of the thrust force generated by the driving of the electric motor when the running state cannot be calculated has been described as being set to the thrust force that can provide the deceleration of 1.5 m/s$^2$ to the vehicle by way of example. However, the maximum value of the thrust force generated by the driving of the electric motor when the running state cannot be calculated is not limited thereto, and may be set to, for example, the full clamp value (the thrust force that allows the vehicle to be kept stopped on the predetermined gradient prescribed by the regulations, such as the thrust force that can provide the deceleration of 3.0 m/s$^2$ to the vehicle if the vehicle is running).

In the above-described third embodiment, the parking brake control apparatus 20 has been described as being configured to perform the stepwise application control until the maximum value of the thrust force generated by the driving of the electric motor reaches the thrust force that can provide the deceleration of 1.5 m/s$^2$ to the vehicle. However, the brake control apparatus is not limited thereto, and may be configured to, for example, perform the static application control until the maximum value of the thrust force generated by the driving of the electric motor reaches the thrust force that can provide the deceleration of 1.5 m/s$^2$ to the vehicle.

In the above-described first embodiment, the parking brake control apparatus 20 has been described as being configured to control the electric motor 43B so as to change the thrust force of the piston 39 in the stepwise manner when the running state cannot be calculated by way of example. However, the brake control apparatus is not limited thereto, and may be configured to, for example, perform PWM control (pulse width modulation switching control) on the electric motor. More specifically, the parking brake control apparatus 20 can be configured to periodically (intermittently) supply power to the electric motor (switching control) when increasing the thrust force. Now, the PWM control refers to switching control using a duty ratio variable within a range from 0% to 100% (using a variable cycle, a variable pulse width, and a variable number of pulses if necessary). In other words, the PWM control refers to current control of using the variable duty ratio based on, for example, a high frequency (cycle) around 1 kHz to reduce an output voltage, thereby controlling a current so as to reduce the supplied current.

In the case where the PWM control is performed, the brake control apparatus reduces the voltage output to the electric motor by employing a lower duty ratio for the switching control when the running state cannot be calculated than when the running state can be calculated. By this control, the brake control apparatus can control the electric motor in such a manner that the thrust force of the piston changes at a lower time rate of change when the running state cannot be calculated than when the running state can be calculated. In other words, the strength of the thrust force of the piston can increase according to the increase in the time period for which the application request signal is received. Further, the brake control apparatus may be configured to, for example, increase a change rate (an increase rate) of the thrust force by increasing the duty ratio according to the increase in the time period for which the application request signal is received in the case where the PWM control is performed. For example, the brake control apparatus may employ a higher duty ratio when the application request signal is received for a time period exceeding a predetermined time period than a duty ratio before the predetermined time period has elapsed. The same also applies to the other embodiments.

In the above-described embodiments, the brake control apparatus has been described assuming that the disk brake 31 equipped with the electric parking brake function is used as each of the brakes on the rear left and right wheel sides by way of example. However, the configuration of the vehicle is not limited thereto, and the disk brake equipped with the electric parking brake function may be used as the brake on each of the front left and right wheel sides. Alternatively, each of the brakes on the all the front and rear wheels (all of the four wheels) may be embodied by the disk brake equipped with the electric parking brake function In the above-described embodiments, the brake control apparatus has been described assuming that the hydraulic disk brake 31 equipped with the electric parking brake is employed as the brake apparatus by way of example. However, the employed brake apparatus is not limited thereto and may be embodied by an electric disk brake that does not require hydraulic supply. Further, the brake apparatus is not limited to the disk brake-type brake apparatus, and may be configured as a drum brake-type brake apparatus. Further examples of the employable brake mechanism include various types of brake mechanisms, such as a drum-in disk brake in which a drum-type electric parking brake is provided in a disk brake, and a configuration that holds the parking bake by pulling a cable with use of an electric motor. In this case, in the case where, for example, the vehicle employs the electric disk brake that does not require hydraulic supply, the control portion can be configured to provide the braking force to the vehicle as the regular brake (drive the electric motor based on the application request according to the operation on the brake pedal or the like).

Further, each of the embodiments are merely examples, and, needless to say, the configurations indicated in the different embodiments can be partially replaced or combined with each other.

According to the above-described embodiments, the brake control apparatus can prevent or reduce the excessive application of the braking force when the running state of the vehicle (whether the vehicle is running or stopped) cannot be calculated. In other words, the brake control apparatus can improve the stability of the application of the braking force when the running state of the vehicle cannot be calculated.

That is, according to the embodiment, when the running state cannot be calculated by the running state detection portion, the control portion controls the electric motor in such a manner that the thrust force of the pressing member changes at the lower time rate of change than when the running state can be calculated. More specifically, when the running state cannot be calculated by the running state detection portion, the control portion controls the electric motor in such a manner that the thrust force of the pressing member changes in the stepwise manner. In other words, the control portion increases the strength of the thrust force of the pressing member according to the increase in the time period for which the activation request signal for the activation for holding the pressing member is received. Therefore, the brake control apparatus can prevent or reduce the excessive application of the braking force generated by the parking brake even while the vehicle is running.

According to the embodiment, the control portion stores the predetermined thrust force value when the running state can be calculated by the running state detection portion and when the vehicle is detected to be stopped. When the running state cannot be calculated by the running state detection portion, the control portion drives the electric motor to advance the pressing member and keeps the thrust force of the pressing member at the predetermined thrust force value when the strength of the thrust force of the pressing member reaches the predetermined thrust force value while the activation request signal for the activation for holding the pressing member is received, and also keeps the thrust force of the pressing member at the predetermined thrust force value after the reception of the activation request signal for the activation for holding the pressing member is stopped. By this configuration, even when the running state cannot be calculated by the running state detection portion, the brake control apparatus can keep the thrust force of the pressing member at the predetermined thrust force value when the vehicle is detected to be stopped. In other words, the vehicle can be kept stopped even when the running state cannot be calculated by the running state detection portion.

According to the embodiment, the control portion releases the thrust force of the pressing member, if the reception of the activation request signal for the activation for holding the pressing member is stopped before the strength of the thrust force of the pressing member reaches the predetermined thrust force value after the control portion drives the electric motor to advance the pressing member. In this case, the driver can release the thrust force even without operating the operation instruction portion toward the release side, before the thrust force reaches the predetermined thrust force value.

According to the embodiment, when the running state cannot be calculated by the running state detection portion, the control portion performs the control of holding the pressing member with use of the pressing member holding mechanism until the activation request signal for the activation for holding the pressing member or the activation for releasing the pressing member is output, when the reception of the activation request signal for the activation for holding the pressing member is stopped. Therefore, when the running state cannot be calculated, the pressing member is held by the pressing member holding mechanism even if the reception of the activation request signal for the activation for holding the pressing member is stopped due to, for example, the operational error made by the driver when the activation request signal for the activation for holding the pressing member according to the operation instruction from the driver is received.

In other words, even if the driver takes his/her hand operating the operation instruction portion off from the operation instruction portion by mistake in the middle of operating the operation instruction portion from which the activation request signal is output toward the holding activation side, the braking force at this time is maintained until the driver operates the operation instruction portion toward the holding activation side again or toward the release activation side. If the vehicle is running at this time, the "application of the braking force" required by the driver can continue, and, for example, the vehicle can be stopped with a further shorter braking distance. On the other hand, even if the vehicle is stopped, the "application of the braking force" required by the driver can also continue, and the vehicle can be kept stopped. In either case, the stability of the application of the braking force to the vehicle can be improved.

According to the embodiments, the control portion performs the control of, upon receiving the activation request signal for the holding activation, increasing the pressing force of the braking member until the pressing force reaches the preset predetermined value and then holding the pressing member with use of the pressing member holding mechanism until receiving the activation request signal for the release activation next regardless of the reception state of this activation request signal for the holding activation. Therefore, when the running state cannot be calculated, the pressing member is held by the pressing member holding mechanism after the pressing force of the braking member is increased to the preset predetermined value even if the reception of the request signal for the holding activation is stopped due to, for example, the operational error made by the driver when the request signal for the holding activation according to the operation instruction from the driver is received.

In other words, even if the driver takes his/her hand operating the operation instruction portion off from the operation instruction portion by mistake in the middle of operating the operation instruction portion from which the activation request signal is output toward the holding activation side, the braking force is increased to the predetermined value and is kept at the predetermined value until the driver operates the operation instruction portion toward the release activation side. Therefore, regardless of whether the vehicle is running or stopped, the "application of the braking force" required by the driver can continue, and the stability of the application of the braking force to the vehicle can be improved.

REFERENCE SIGN LIST 2 front wheel (wheel)
3 rear wheel (wheel)
4 disk rotor (braking target member)
19 parking brake switch (operation instruction portion)
20 parking brake control apparatus (control portion, running state detection portion)
22 memory (storage portion)
25 current sensor portion (detection portion)
33 brake pad (braking member)
39 piston (pressing member)
40 rotation-linear motion conversion mechanism (pressing member holding mechanism)
43B electric motor

The invention claimed is:

1. A brake control apparatus comprising:
   a braking member configured to press a braking target member rotating together with a wheel;
   a pressing member configured to displace the braking member in directions away from and toward the braking target member;
   a pressing member holding mechanism provided on a non-rotatable portion of a vehicle and configured to hold the pressing member advanced by an electric motor; and
   a control portion configured to receive an activation request signal for activation for holding or releasing the pressing member according to an operation instruction from a driver, and control driving of the electric motor so as to displace the pressing member according to the activation request signal,
   wherein the control portion includes a running state detection portion configured to calculate a running state about whether the vehicle is running or stopped, and
   wherein, when the running state cannot be calculated by the running state detection portion, the control portion controls the electric motor in such a manner that a thrust force of the pressing member changes at a lower time rate of change than when the running state can be calculated.

2. The brake control apparatus according to claim 1, wherein, when the running state cannot be calculated by the running state detection portion, the control portion controls the electric motor in such a manner that the thrust force of the pressing member changes in a stepwise manner.

3. The brake control apparatus according to claim 1, wherein the control portion increases strength of the thrust force of the pressing member according to an increase in a time period for which the activation request signal for the activation for holding the pressing member is received.

4. The brake control apparatus according to claim 1, wherein the control portion stores a predetermined thrust force value when the running state can be calculated by the running state detection portion and when the vehicle is detected to be stopped, and
   wherein, when the running state cannot be calculated by the running state detection portion, the control portion drives the electric motor to advance the pressing member and keeps the thrust force of the pressing member at the predetermined thrust force value when strength of the thrust force of the pressing member reaches the predetermined thrust force value while the activation request signal for the activation for holding the pressing member is received, and also keeps the thrust force of the pressing member at the predetermined thrust force value after the reception of the activation request signal for the activation for holding the pressing member is stopped.

5. The brake control apparatus according to claim 4, wherein the control portion releases the thrust force of the pressing member, if the reception of the activation request signal for the activation for holding the pressing member is stopped before the strength of the thrust force of the pressing member reaches the predetermined thrust force value after the control portion drives the electric motor to advance the pressing member.

6. A brake control apparatus comprising:

a braking member configured to press a braking target member rotating together with a wheel;

a pressing member configured to displace the braking member in directions away from and toward the braking target member;

a pressing member holding mechanism provided on a non-rotatable portion of a vehicle and configured to hold the pressing member advanced by an electric motor; and a control portion configured to receive an activation request signal for activation for holding or releasing the pressing member according to an operation instruction from a driver, and control driving of the electric motor so as to displace the pressing member according to the activation request signal, wherein the control portion includes a running state detection portion configured to calculate a running state about whether the vehicle is running or stopped, and wherein the control portion is configured to, when the running state cannot be calculated by the running state detection portion, drive the electric motor to advance the pressing member while the activation request signal for the activation for holding the pressing member is received, stop the electric motor to hold the pressing member at a position to which the pressing member is advanced when the reception of the activation request signal for the activation for holding the pressing member is stopped, and maintain the position of the pressing member by the pressing member holding mechanism until the activation request signal for the activation for holding the pressing member or the activation for releasing the pressing member is output.

* * * * *